United States Patent
Wilkinson

(10) Patent No.: US 11,555,296 B2
(45) Date of Patent: Jan. 17, 2023

(54) WATER MAIN FLUSHING WITH HIGH PRESSURE JETTING AND DIRECTIONAL CONTROL

(71) Applicant: NO-DES, Inc., Los Lunas, NM (US)

(72) Inventor: Chris Eric Wilkinson, Los Lunas, NM (US)

(73) Assignee: NO-DES, Inc., Los Lunas, NM (US)

(*) Notice: Subject to any disclaimer, the term of this patent is extended or adjusted under 35 U.S.C. 154(b) by 0 days.

(21) Appl. No.: 16/818,143

(22) Filed: Mar. 13, 2020

(65) Prior Publication Data

US 2021/0087797 A1     Mar. 25, 2021

Related U.S. Application Data

(63) Continuation-in-part of application No. 16/745,859, filed on Jan. 17, 2020, which is a continuation-in-part of application No. 16/575,537, filed on Sep. 19, 2019.

(51) Int. Cl.
*E03B 7/00* (2006.01)
*B08B 9/049* (2006.01)
(Continued)

(52) U.S. Cl.
CPC ............ *E03B 7/006* (2013.01); *B08B 9/0495* (2013.01); *F16L 55/46* (2013.01); *F16L 2101/12* (2013.01)

(58) Field of Classification Search
CPC ...... B08B 9/0495–0497; B08B 9/0558; B08B 9/0433; B08B 9/027–053; E03B 7/006;
(Continued)

(56) References Cited

U.S. PATENT DOCUMENTS 3,658,589 A * 4/1972 Shaddock ................ E03F 9/00
                                                                 134/10
3,678,948 A * 7/1972 Hedges ................ B08B 9/0495
                                                                 134/167 C
(Continued)

FOREIGN PATENT DOCUMENTS

DE        10057373          5/2002
DE        10057373 A1 *    5/2002    ............ G01B 21/08
(Continued)

OTHER PUBLICATIONS

Young, Lee, "PCT International Search Report", PCT International Application No. PCT/US20/41539 filed on Jul. 10, 2020, dated Nov. 24, 2020, Alexandria, VA.

(Continued)

*Primary Examiner* — Mikhail Kornakov
*Assistant Examiner* — Richard Z. Zhang
(74) *Attorney, Agent, or Firm* — Woods Oviatt Gilman LLP; Dennis B. Danella, Esq.

(57) ABSTRACT

A high pressure jetting system includes a recirculating unit connected to an isolated section of a water supply system which remains under system pressure. The recirculating unit includes a filter unit and a pump unit generating a circulating flow of water. A first pig launch and recovery apparatus couples a first hydrant to the recirculating unit and a second pig launch and recovery apparatus couples a second hydrant to the recirculating unit. A camera unit including a camera and drogue chute enters through the first apparatus and travels in a flushing flow direction to the second apparatus. The drogue chute is then removed from the camera. The camera then couples to a jetting unit having a jetting head and hose and re-enters through the second apparatus. The jetting unit emits a plurality of water jets to move in a (Continued)

counter-current flow direction and remove material from the water mains.

34 Claims, 11 Drawing Sheets

(51) Int. Cl.
*F16L 55/46* (2006.01)
*F16L 101/12* (2006.01)

(58) Field of Classification Search
CPC ........ E03B 7/00–14; E03B 7/07; E03B 7/075; E03B 7/078; E03B 9/00–20; E03B 9/02; E03B 9/14; E03B 9/18; F16L 55/128; F16L 55/1283; F16L 55/26; F16L 55/265; F16L 55/28; F16L 55/38; F16L 55/40; F16L 55/46; F16L 55/48
See application file for complete search history.

(56) References Cited

U.S. PATENT DOCUMENTS

| | | | |
|---|---|---|---|
| 4,495,808 A | 1/1985 | Fischer, III | |
| 4,856,937 A | 8/1989 | Grocott et al. | |
| 5,084,764 A * | 1/1992 | Day | G01M 3/005 348/84 |
| 5,437,302 A | 8/1995 | Da Silva et al. | |
| 6,485,577 B1 | 11/2002 | Kiholm | |
| 6,627,089 B1 | 9/2003 | Wilkinson | |
| 2001/0003307 A1 | 6/2001 | Sivacoe | |
| 2004/0020270 A1 * | 2/2004 | Kuikka | G01M 3/38 73/49.5 |
| 2004/0079929 A1 | 4/2004 | Delaforce et al. | |
| 2011/0031195 A1 * | 2/2011 | Wilkinson | B08B 9/0325 210/790 |
| 2011/0100479 A1 | 5/2011 | Devine | |
| 2012/0090414 A1 * | 4/2012 | Kearns | F16L 55/46 73/865.8 |
| 2013/0019684 A1 * | 1/2013 | Krywyj | G01M 3/005 73/592 |
| 2013/0111680 A1 | 5/2013 | Archer et al. | |
| 2018/0217023 A1 * | 8/2018 | Hansen | G01M 5/0083 |
| 2019/0063663 A1 * | 2/2019 | Poe | F16L 23/006 |
| 2020/0080910 A1 * | 3/2020 | Da Silva | F16L 55/46 |
| 2021/0003242 A1 | 1/2021 | Baugh | |

FOREIGN PATENT DOCUMENTS

| | | | | |
|---|---|---|---|---|
| DE | 102013009967 | | 12/2014 | |
| DE | 102013009967 A1 * | 12/2014 | | B08B 9/0495 |
| JP | 200825283 | | 2/2008 | |
| JP | 2009066522 | | 4/2009 | |
| JP | 2009066522 A * | 4/2009 | | |
| JP | 2018061951 | | 4/2018 | |
| JP | 2018061951 A * | 4/2018 | | |
| KR | 20170112470 A * | 10/2017 | | |
| KR | 1020170112470 | | 10/2017 | |
| WO | 9531295 | | 11/1995 | |
| WO | WO-9531295 A1 * | 11/1995 | | B08B 9/0495 |
| WO | WO-9724194 A1 * | 7/1997 | | B08B 9/043 |
| WO | 0244601 | | 6/2002 | |

OTHER PUBLICATIONS

Young, Lee, "PCT Written Opinion of the International Searching Authority", PCT International Application No. PCT/US20/41539 filed on Jul. 10, 2020, dated Nov. 24, 2020, Alexandria, VA.
Zhang, Richard Z, Non-Final Office Action, U.S. Appl. No. 16/745,859, dated Nov. 1, 2021, 30 pages, U.S. Patent & Trademark Office.
Chin Randall E., Non-Final Office Action, U.S. Appl. No. 16/575,537, dated Apr. 6, 2022, 11 pages, U.S. Patent & Trademark Office.
Chin Randall E., Final Office Action, U.S. Appl. No. 16/575,537, filed Jul. 28, 2022, 16 pages, U.S. Patent & Trademark Office.

* cited by examiner

WATER MAIN FLUSHING WITH HIGH PRESSURE JETTING AND DIRECTIONAL CONTROL

CROSS-REFERENCE TO RELATED APPLICATIONS

This application is a continuation-in-part application of U.S. patent application Ser. No. 16/745,859, filed Jan. 17, 2020, entitled WATER MAIN FLUSHING WITH HIGH PRESSURE JETTING, which is a continuation-in-part application of U.S. patent application Ser. No. 16/575,537, filed Sep. 19, 2019, entitled PIG LAUNCH AND RECOVERY APPARATUS AND PIG THEREFOR, the entirety of each being incorporated herein by reference.

FIELD OF THE INVENTION

The present invention relates to a method and equipment for inspecting, cleaning and maintaining a water main or other type of piping system, and in particular, to a pig launch and recovery apparatus and pig therefor, and a method of inspecting, cleaning and maintaining a section of water main between hydrants using the pig and pig launch and recovery apparatus under system pressure and using a circulating flushing flow. Another aspect of the present invention relates to a system and method for flushing a water supply system using high pressure jetting.

BACKGROUND OF THE INVENTION

Almost all water providers are required to have their water mains large enough to provide a sufficient flow for fire suppression. This means that the flow rate or velocities in the large mains during normal use are reduced significantly, allowing particulates that are suspended in the water to settle to the bottom of the pipe and also substances such as iron, manganese, bio-film, etc. (collectively "substances") to adhere to the inside surfaces of the pipe. After a length, of time the settled particulates and substances, build up and, if there are any surges in the system, the particulates and substances, are stirred up and thereby increase the turbidity in the water. To address this issue and minimize the potential turbidity in the water, the piping system may be flushed periodically from hydrants and blow-offs located throughout the system. However, this method wastes millions of gallons of water each year, may cause property damage, flood streets causing traffic problems, and is usually performed at night to avoid the public eye, making the flushing procedure costly.

In addition to the above problems, new regulations require that the water be de-chlorinated before it is allowed to drain into any storm drainage system. A NPDES (National Pollutant Discharge Elimination System) permit is required and containment systems need to be in place to protect against washing silt and other materials into the storm drains.

From time to time, it is necessary to flush water systems which deliver potable tap water. This is especially the case with newly installed water mains. Before water passing through a water main can be used for drinking water purposes, it is necessary to thoroughly flush the mains with tap water. In order to maintain water quality, it is also necessary, from time to time, to flush local tap water delivery systems such as neighborhood and subdivision tap water systems.

Generally, discharges from potable water systems result from overflow, flushing, disinfection, hydrostatic testing, mechanical cleaning or dewatering of vessels or structures used to store or convey potable water. This frequently includes fire hydrant flushing in which high velocity streams are generated on the order of 2,000 gallons per minute for a period of 10-15 minutes. By periodically testing fire hydrants (fire flow testing), it can be determined if sufficient water is available in the system for firefighting purposes.

Potable tap water usually contains residual chlorine. The Federal Clean Water Act and state agency regulations regarding discharges of potable water, require that total maximum daily amount of residual chlorine must be less than 0.1 mg/liter. At levels higher than 0.1 mg/liter, aquatic life is endangered and fish kills can occur. Since potable tap water and water discharged from fire hydrants are typically chlorinated, heavy discharges of this water will adversely affect aquatic life unless the amount of residual chlorine is reduced to less than 0.1 mg/liter. In the past, this was either not done or, when attempted, was done by injecting sodium sulfite into the discharge stream. This is a difficult process to perform and monitor because it is necessary to dispense sodium sulfite in controlled amounts according to the volume of water being treated. If there is too much sodium sulfite, it can itself cause pollution problems by interfering with pH levels and if the amount is insufficient, there will be excessive residual chlorine. It has been found that the injection approach requires not only highly skilled personnel, but extensive training. Moreover, the end result is unpredictable. Thus, while some attempts have been made at improving water main flushing systems, the real problems of water waste and water quality still remain to be addressed.

The above-discussed issues may be compounded during "pigging" operations. Pigging in the context of pipelines refers to the practice of using devices known as "pigs" to perform various maintenance operations. This normally cannot be done without stopping the flow of the product in the pipeline (usually oil and gas), or most often when used in water pipes, only after the pipeline is drained. These operations include but are not limited to cleaning, videoing/inspecting, GIS (locating), and leak detection from inside the pipeline.

Water industry personnel have been looking for ways to perform pigging without having to either dig up the water main, depressurize the main, impact the customer, or waste the water. Video pigs are normally cameras attached to a push-thru cable and most cleaning pigs are normally attached to pull-thru cables. In each case, the pipes are cut into to create launch and recovery stations. Moreover, pigging potable water pipes that carry drinking water has been performed since pipelines were created; but the one issue all pigging services have in common is that they always must depressurize the water main to insert the pig. Once the pigging was completed, the water main still needs to be flushed to waste before it can be put back into service, thus prolonging the downtime of the water main, as well as wasting water. Even more problematic, it has been shown that once a main is de-pressurized, it is more susceptible to leaks in the future.

Video camera pig systems normally use an umbilical cable, which limits travel to the amount of cable on hand, while others are configured as free-flowing pigs inside the pipe. Similarly, geographic information system (GIS) pigs and leak detection pigs may also be configured as free-flowing pigs inside the pipe. As a result, each of these system require launch and recovery points, depend on existing distribution flows inside the mains and can only be recovered by opening a fire hydrant and wasting water (additional water is then wasted to flush the main when completed).

Moreover, commercial servicers typically offer only one of these above services, meaning that multiple servicers are needed depending upon the type of service requested. A further drawback to these systems is that the pigs can become lost within the pipe system, and because water distribution mains are installed on almost every street in every city, a grid of loops and dead-ends is created that is not conducive to installing entry and exit points for traditional pigs.

What is needed is a system for periodically inspecting, cleaning and maintaining water mains or other piping systems that does not require depressurization of the main, wasting the water, or dumping water containing chemicals and pipe sediments into the environment. The present invention addresses these needs as well as other needs.

SUMMARY OF THE INVENTION

In accordance with one aspect of the present invention, a pig launch and recovery apparatus for use with a water supply system having a plurality of sections including water mains, pipes, hydrants and valves is provided. The apparatus comprises a flow tube having a first flow end configured to couple with a recirculating unit including a pump, an opposing second flow end configured to mount to a hydrant, and a main flow valve located therebetween. The apparatus further includes a launch and recovery tube having a first launch end fluidly coupled to the flow tube between the first flow end and the main flow valve, and a second launch end fluidly coupled to the flow tube between the main flow valve and the second flow end. The launch and recovery tube may also include a first valve proximate the first launch end, a second valve proximate the second launch end, and a tube access door located therebetween. The second launch end may also be coupled to the flow tube at an angle relative to a longitudinal axis of the flow tube, wherein the angle is about 45 degrees in one example. The flow tube also includes an angled screen configured to form a secondary fluid pathway with the second launch end of the launch and recovery tube, and the launch and recovery tube may further include a bleed valve located between the first valve and the second valve.

In a further aspect of the present invention, a closed conduit system for use in a water supply system having a plurality of sections including water mains, pipes, hydrants and valves is provided. The system may comprise a recirculating unit including at least one pump and at least one filter. The system further includes a first pig launch and recovery apparatus comprising a flow tube having a first flow end configured to fluidly couple with the recirculating unit, an opposing second flow end configured to be fluidly coupled to a first hydrant, and a main flow valve located therebetween. The first pig launch and recovery apparatus further includes a launch and recovery tube having a first launch end fluidly coupled to the flow tube between the first flow end and the main flow valve, and a second launch end fluidly coupled to the flow tube between the main flow valve and the second flow end.

The system further includes a second pig launch and recovery apparatus comprising a flow tube having a first flow end configured to fluidly couple with the recirculating unit, an opposing second flow end configured to be fluidly coupled to a second hydrant, and a main flow valve located therebetween. The second pig launch and recovery apparatus further includes a launch and recovery tube having a first launch end fluidly coupled to the flow tube between the first flow end and the main flow valve, and a second launch end fluidly coupled to the flow tube between the main flow valve and the second flow end. An isolated section of the water supply system is defined between the first hydrant and the second hydrant, and the recirculating unit, the first pig launch and recovery apparatus, the second pig launch and recovery apparatus and the isolated section form a closed recirculating fluid circuit.

The closed conduit system may further comprise a pig configured to be loaded into the launch and recovery tube of the first pig launch and recovery apparatus, travel through the isolated section of the water supply system, and be retrieved at the launch and recovery tube of the second pig launch and recovery apparatus. The pig may include one or more of a camera, a global positioning sensor, a scrubber, a battery and a light. The recirculating unit may be mounted on a vehicle, such as a large bobtail truck, semi-truck/trailer or a trailer.

In still another aspect of the present invention, a method for pigging a section of a water supply system having a plurality of sections including water mains, pipes, hydrants and valves is provided. The method comprises the steps of connecting a first pig launch and recovery apparatus to the first hydrant; connecting a second pig launch and recovery apparatus to the second hydrant; connecting a recirculating unit to the first and second pig launch and recovery apparatuses to create a closed recirculating fluid circuit; isolating a section of a water supply system between a first hydrant and a second hydrant; loading a pig in the first pig launch and recovery apparatus; pumping water through the closed recirculating fluid circuit to drive the pig from the first pig launch and recovery apparatus to the second pig launch and recovery apparatus; and removing the pig from the second pig launch and recovery apparatus.

Each of the first pig launch and recovery apparatus and the second pig launch and recovery apparatus comprise a flow tube having a first flow end configured to fluidly couple with a recirculating unit including a pump, an opposing second flow end configured to be fluidly coupled to the respective first or second hydrant, and a main flow valve located between the first flow end and the second flow end; and a launch and recovery tube having a first launch end fluidly coupled to the flow tube between the first flow end and the main flow valve, and a second launch end fluidly coupled to the flow tube between the main flow valve and the second flow end. The pig may include one or more of a camera, a global positioning sensor, a scrubber, a battery and a light. The recirculating unit may be mounted on a vehicle, such as a large bobtail truck, semi-truck/trailer or a trailer.

In yet another aspect of the present invention, a pig apparatus for use with a water supply system having a plurality of sections including water mains, pipes, hydrants and valves is provided. The pig apparatus comprises a riser includes a first end and a second end. The pig apparatus also includes a drogue chute including a webbing canopy connected to the first end of the riser through at least two suspension lines, and a pig load connected to the second end of the riser. The pig load may include one or more of a camera, a global positioning sensor, a scrubber, a battery and a light. In one aspect, the pig apparatus may further include a plurality of stabilizer guides coupled with the pig load. At least one pivoting mount may be connected to the pig load, wherein the plurality of stabilizer guides are coupled to the pig load using the at least one pivoting mount. In another aspect, the pig load may include a scrubber, wherein the scrubber includes a scrubber body having an outer surface, and wherein a plurality of spring wire brushes extend radially outwardly from the outer surface of the scrubber body. The plurality of spring wire brushes may collectively define a scrubbing unit having a first diameter that is greater than a second diameter of a water main that the pig apparatus is configured to be positioned within.

In still another aspect of the present invention, a high pressure jetting system for use with a water supply system having a plurality of sections including water mains, pipes, hydrants and valves. The high pressure jetting system includes a recirculating unit configured to connect to an isolated section of the water supply system between a first point and a second point while the isolated section remains under water supply system pressure. The recirculating unit includes at least one filter unit defining a closed circuit that includes the isolated section and at least one pump unit capable of generating a circulating flow of water. A first pig launch and recovery apparatus is configured to couple the first point to the recirculating unit and a second pig launch and recovery apparatus is configured to couple the second point to the recirculating unit. A jetting unit includes a jetting head coupled to a jetting hose. The jetting unit is configured to enter the closed circuit through the second pig launch and recovery apparatus and travel within the isolated section. The jetting head is configured to emit a plurality of water jets to assist removal of material from an inner surface of the water mains and pipes defining at least a portion of the isolated section.

In a further aspect of the present invention, the jetting unit may move in a counter-current flow direction from the second point to the first point which is opposite to a normal flushing flow direction of the circulating flow of water from the first point to the second point. The removed material may then move in the normal flushing flow direction to the at least one filter unit whereby the removed material is filtered out of the circulating flow of water before the water returns to the first pig launch and recovery apparatus.

In another aspect of the present invention, the high pressure jetting system may also include a camera unit including a camera. The camera may be configured to enter the closed circuit through the first pig launch and recovery apparatus. The camera may be initially configured to travel in the normal flushing flow direction until the camera is proximate the jetting unit, whereby the camera then moves in conjunction with the jetting unit in the counter-current flow direction so as to provide a visual output of the removal of material from the inner surface.

In still another aspect of the present invention, the water jets may be emitted at an angle relative to the jetting hose, where the angle may be between 30 degrees and 60 degrees. Also, the recirculating unit and jetting unit may be mounted on a vehicle. Additionally or alternatively, the recirculating unit may be mounted on a first vehicle while the jetting unit may be mounted on a second vehicle. And still further, the recirculating unit, jetting unit and camera unit may be mounted on one or more vehicles, such as the recirculating unit being mounted on a first vehicle, the jetting unit being mounted on a second vehicle and the camera unit being mounted on a third vehicle.

In yet a further aspect of the present invention, the first point is a first hydrant and the second point is a second hydrant, and each pig launch and recovery apparatus may include a flow tube and launch and recovery tube. Each flow tube has a first flow end, a second flow end, and a main flow valve located between the first flow end and the second flow end. The first flow end is configured to be fluidly connected with the recirculating unit and the second flow end is configured to be fluidly connected with its respective hydrant. Each launch and recovery tube has a first launch end and a second launch end. The first launch end is fluidly connected to the flow tube between the first flow end and the main flow valve and the second launch end is fluidly connected to the flow tube between the main flow valve and the second flow end. The camera may enter the closed circuit through the second launch end of the first pig launch and recovery apparatus and the jetting unit may enter the closed circuit through the second launch end of the second pig launch and recovery apparatus.

In still another aspect of the present invention, a method for cleaning and flushing an isolated section of a water supply system having a plurality of sections including water mains, pipes, hydrants and valves includes: a) connecting a first pig launch and recovery apparatus to a first hydrant; b) connecting a second pig launch and recovery apparatus to a second hydrant; c) connecting a recirculating unit to the first and second pig launch and recovery apparatuses to create a closed circuit including the isolated section and the recirculating unit, wherein the recirculating unit includes at least one filter unit and at least one pump unit capable of generating a circulating flow of water from the first pig launch and recovery apparatus to the second pig launch and recovery apparatus; d) loading a jetting unit into the second pig launch and recovery apparatus; and e) providing a high pressure fluid to the jetting unit to drive the jetting unit from the second pig launch and recovery apparatus toward the first pig launch and recovery apparatus, wherein the high pressure fluid is emitted as a plurality of water jets from a jetting head to assist removal of material from an inner surface of the water mains and pipes defining at least a portion of the isolated section.

In yet another aspect of the present invention, the method may further include filtering the removed material from the circulating flow of water before the water returns to the first pig launch and recovery apparatus and/or loading a camera unit including a camera into the first pig launch and recovery apparatus, wherein the camera is initially configured to travel in the normal flushing flow direction until the camera is proximate the jetting unit, whereby the camera then moves in conjunction with the jetting unit in the counter-current flow direction so as to provide a visual output of the removal of material from the inner surface of the water mains and pipes.

In still another aspect of the present invention, a high pressure jetting system for use with a water supply system having a plurality of sections including water mains, pipes, hydrants and valves, the high pressure jetting system comprises a recirculating unit configured to connect to an isolated section of the water supply system between a first point and a second point while the isolated section remains under water supply system pressure. The recirculating unit includes at least one filter unit defining a closed circuit that includes the isolated section and at least one pump unit capable of generating a circulating flow of water. A first pig launch and recovery apparatus is configured to couple the first point to the recirculating unit and a second pig launch and recovery apparatus is configured to couple the second point to the recirculating unit.

A jetting unit including a jetting head coupled to a jetting hose is configured to enter the closed circuit through the second pig launch and recovery apparatus and travel within the isolated section. The jetting head is configured to emit a plurality of water jets to facilitate removal of material from an inner surface of the water mains and pipes defining at least a portion of the isolated section.

A camera unit includes a camera and a drogue chute and is configured to enter the closed circuit through the first pig launch and recovery apparatus. The camera is initially configured to travel in a normal flushing flow direction with assistance from the drogue chute until the camera reaches the second pig launch and recovery apparatus. The drogue chute is removed from the camera and the camera is then coupled to the jetting unit to move in conjunction with the jetting unit in a counter-current flow direction opposite to the normal flushing flow direction.

In another aspect of the present invention, a method for cleaning and flushing an isolated section of a water supply system having a plurality of sections including water mains, pipes, hydrants and valves comprises: a) connecting a first pig launch and recovery apparatus to a first hydrant; b) connecting a second pig launch and recovery apparatus to a second hydrant; c) connecting a recirculating unit to the first and second pig launch and recovery apparatuses to create a closed circuit including the isolated section and the recirculating unit, wherein the recirculating unit includes at least one filter unit and at least one pump unit capable of generating a circulating flow of water from the first pig launch and recovery apparatus to the second pig launch and recovery apparatus; d) loading a camera unit including a camera and a drogue chute into the first pig launch and recovery apparatus; e) providing a flushing flow at the first pig launch and recovery apparatus to drive the camera and drogue chute in a normal flushing flow direction to the second pig launch and recovery apparatus; f) removing the drogue chute from the camera at the second pig launch and recovery apparatus; g) mounting a jetting unit to the camera; h) loading the camera and jetting unit into the second pig launch and recovery apparatus; i) providing a high pressure fluid to the jetting unit to drive the jetting unit in a counter-current flow direction from the second pig launch and recovery apparatus toward the first pig launch and recovery apparatus, wherein the high pressure fluid is emitted as a plurality of water jets from a jetting head to assist removal of material from an inner surface of the water mains and pipes defining at least a portion of the isolated section, and wherein the removed material is carried to the second pig launch and recovery apparatus via the flushing flow.

Additional objects, advantages and novel features of the present invention will be set forth in part in the description which follows, and will in part become apparent to those in the practice of the invention, when considered with the attached figures.

BRIEF DESCRIPTION OF THE DRAWINGS

These and other details of the invention will be described in connection with the accompanying drawing, which is furnished only by way of illustration and not in limitation of the invention, and in which drawing.

DETAILED DESCRIPTION OF THE INVENTION

Figure 1:
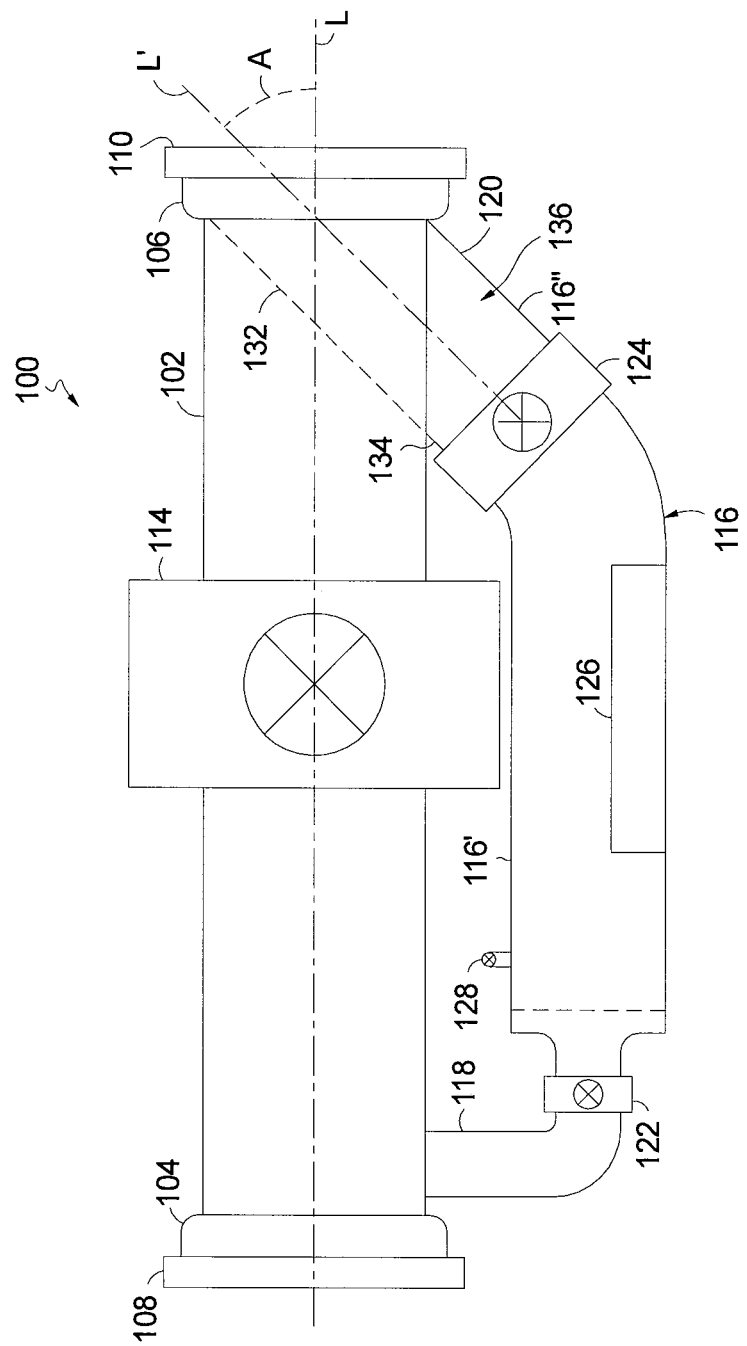
FIG. 1 is a top plan view of a pig launch and recovery apparatus in accordance with an aspect of the invention.

As shown in the drawings, with initial reference to FIG. 1, a pig launch and recovery apparatus for use with a water supply system is generally indicated by reference number 100. Pig launch and recovery apparatus 100 includes a flow tube 102 having a first flow end 104 and a second flow end 106. First flow end 104 includes a fitting 108 that is configured to be coupled to a recirculating unit 218, while second flow end 106 includes a fitting 110 that is configured to mount pig launch and recovery apparatus 100 to a hydrant 112 (see FIG. 2). Further, main flow valve 114 is located between first flow end 104 and second flow end 106, and operates to control the flow rate of water passing through flow tube 102.

Pig launch and recovery apparatus 100 further includes a launch and recovery tube 116 having a first launch end 118 and a second launch end 120. First launch end 118 is coupled in fluid communication with flow tube 102 between first flow end 104 and main flow valve 114, while second launch end 120 is coupled in fluid communication with flow tube 102 between second flow end 106 and main flow valve 114. Launch and recovery tube 116 also includes a first valve 122 proximate first launch end 118, and a second valve 124 that is located proximate second launch end 120. A tube access door 126 is located between first and second valve 122, 124. In accordance with an aspect of the present invention, tube access door 126 is configured to allow a pig to be inserted into and removed from launch and recovery tube 116, such as, but not limited to, pigs 130a, 130b shown in FIGS. 3 and 4, as will be discussed in greater detail below. To allow a user of apparatus 100 to see if pig 130a, 103b is located in launch and recovery tube 116, tube access door 126 may be constructed of a transparent, or translucent material, with non-limiting examples including poly(methyl methacrylate) (PMMA), polycarbonate, polyvinyl chloride and similar materials. Launch and recovery tube 116 may also include a bleed valve 128 to relief pressure within launch and recovery tube 116 during insertion and removal of pig 130a, 130b through tube access door 126.

As seen in FIG. 1, launch and recovery tube 116 may include a first portion 116' which may be generally parallel to the longitudinal axis L of flow tube 102 and a second portion 116" which has a longitudinal axis L' disposed at an angle A relative to axis L. Angle A may be any suitable angle, and in accordance with one aspect of the present invention, may be between about 40 degrees and 50 degrees, and more particularly about 45 degrees. Flow tube 102 may further include an angled screen 132 configured to be disposed at angle A relative to axis L and coincide with an inner sidewall 134 of second portion 116". Screen 132 includes a plurality of through-holes which allow water to travel through flow tube 102 while defining a secondary fluid pathway 136 which directs pig 130a, 130b into or out of launch and recovery tube 116 as will be discussed in greater detail below. It should be understood that other types of guiding mechanisms may be used in addition to or instead of screen 132 to guide FIG. 130a, 130b from recovery tube into flow tube 102.

Figure 1A:
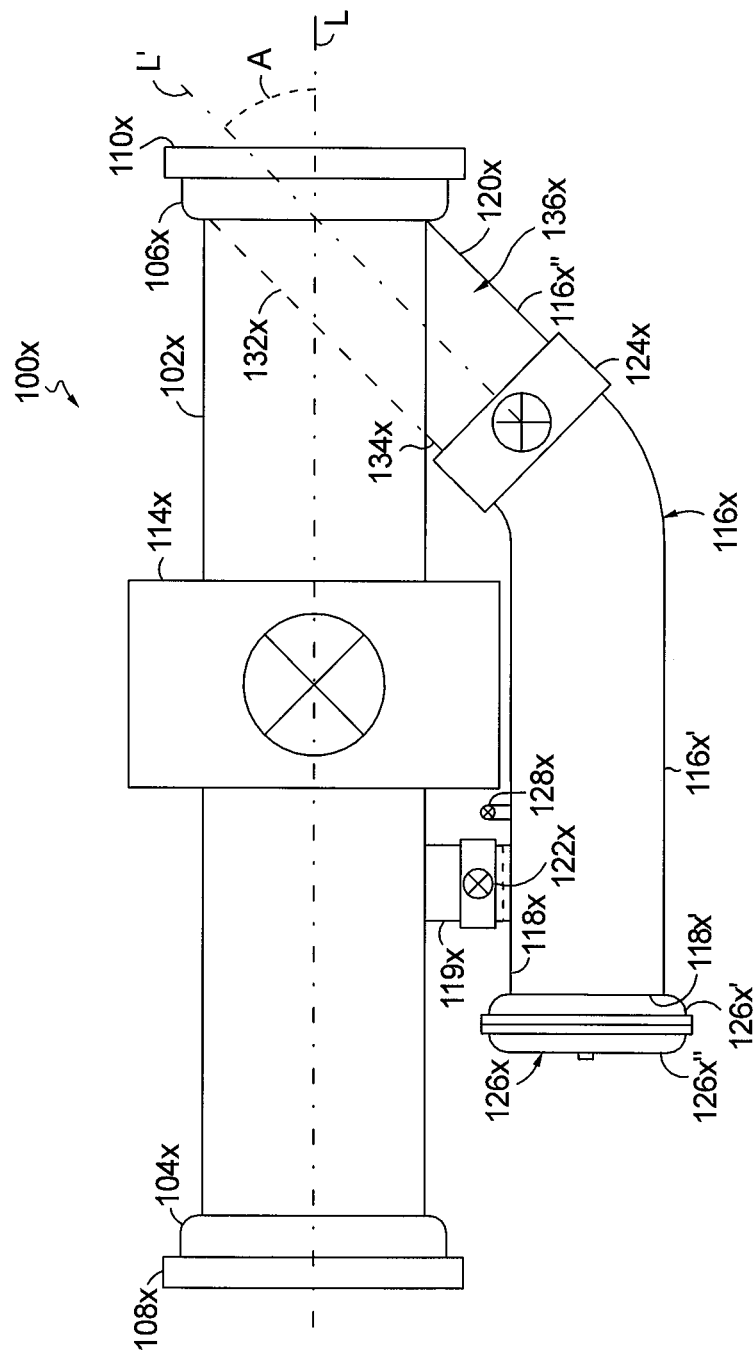
FIG. 1A is a top plan view of an alternative pig launch and recovery apparatus in accordance with an aspect of the invention.

Turning now to FIG. 1A, an alternative pig launch and recovery apparatus for use with a water supply system is generally indicated by reference number 100x. Pig launch and recovery apparatus 100x is similar to pig launch and recovery apparatus 100 described above in all respects except for modifications to launch and recovery tube 116x. As seen in FIG. 1A, launch and recovery tube 116x may include a first portion 116x' which may be generally parallel to the longitudinal axis L of flow tube 102x and a second portion 116x" which has a longitudinal axis L' disposed at an angle A relative to axis L. Angle A may be any suitable angle, and in accordance with one aspect of the present invention, may be between about 40 degrees and 50 degrees, and more particularly about 45 degrees. Flow tube 102x may further include an angled screen 132x configured to be disposed at angle A relative to axis L and coincide with an inner sidewall 134x of second portion 116x". Screen 132x includes a plurality of through-holes which allow water to travel through flow tube 102x while defining a secondary fluid pathway 136x which directs pig 130a, 130b into or out of launch and recovery tube 116x. It should be understood that other types of guiding mechanisms may be used in addition to or instead of screen 132x to guide pig 130a, 130b from recovery tube into flow tube 102x.

Launch and recovery tube 116x has a first launch end 118x and a second launch end 120x. First launch end 118x is coupled in fluid communication with flow tube 102x via a flow conduit 119x located between first flow end 104x and main flow valve 114x. Second launch end 120x is coupled in fluid communication with flow tube 102x as described above. Flow conduit 119x includes a first valve 122x while a second valve 124x that is located proximate second launch end 120x. Terminal end 118x' of first launch end 118x is capped by a tube access plug 126x. In accordance with an aspect of the present invention, plug 126x is a threaded coupling including a tube fitting 126x' and cap 126x". By way of example and without limitation thereto, tube fitting 126x' may be a Storz adapter while cap 126x" is a corresponding Storz cap. Plug 126x is configured to allow pig 130a, 120b to be inserted into and removed from launch and recovery tube 116x after closing of first valve 122x and second valve 124x. Tube access door 126 and tube access plug 126x may be collectively and interchangeably referred to as a tube access apparatus. Launch and recovery tube 116x may also include a bleed valve 128x to relief pressure within launch and recovery tube 116x during insertion and removal of pig 130a, 130b.

Figure 2:
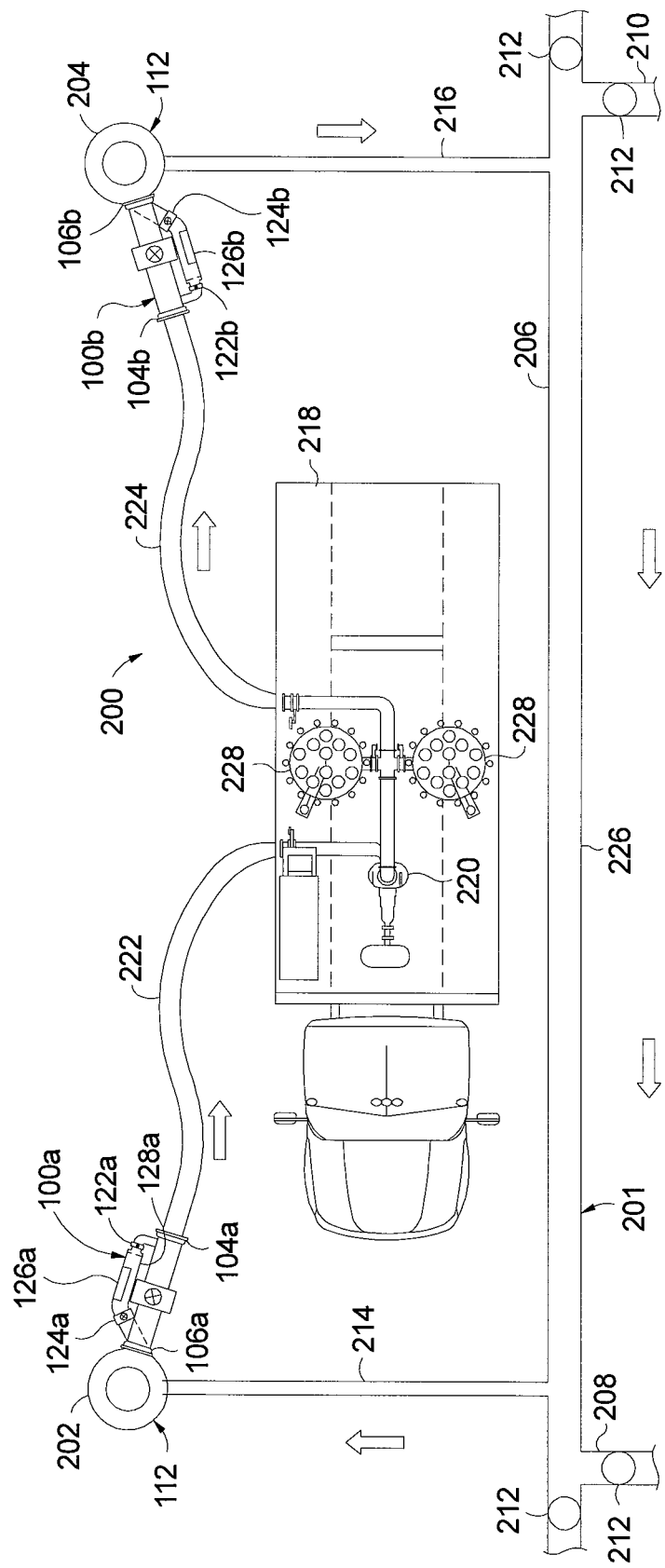
FIG. 2 is a schematic view of a closed conduit system for a municipal water supply system employing a pair of pig launch and recovery apparatuses in accordance with another aspect of the invention.
Figure 2A:
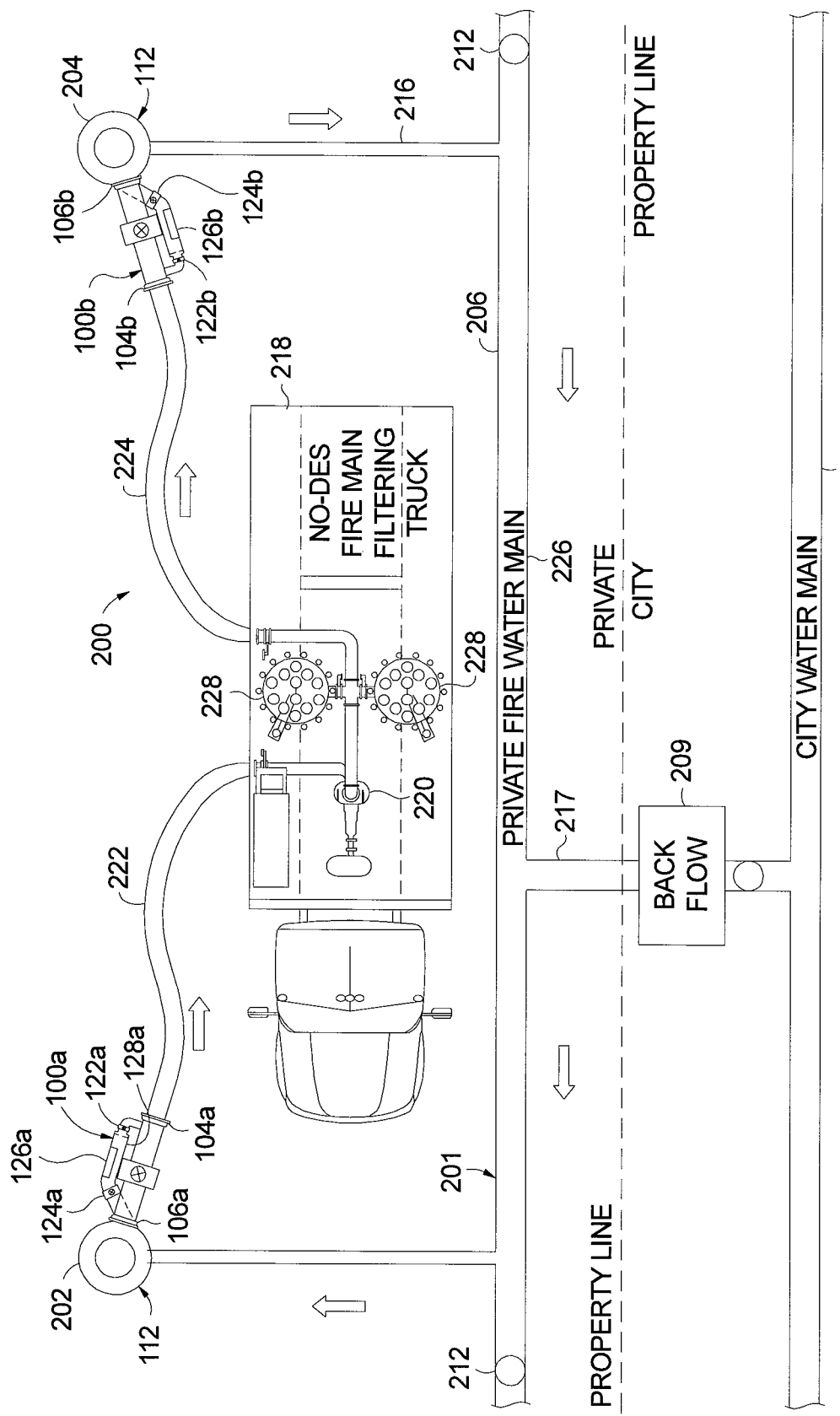
FIG. 2A is a schematic view of a closed conduit system for a private fire water supply system employing a pair of pig launch and recovery apparatuses in accordance with another aspect of the invention.

Turning now to FIGS. 2 and 2A, in accordance with a further aspect of the present invention, a closed conduit system 200 conducts a flow of water (flow direction indicated by arrows) between a first point, e.g., first hydrant 202 and a second point, e.g., second hydrant 204 in a water supply system 201. Water mains 206, 208, 210 and valves 212 and trunk pipes 214, 216 are connected to hydrants 202, 204. As shown in FIG. 2A, water main 206 is a private fire water main receiving water from a municipal water main 207. A back flow preventer 209 may be placed along trunk pipe 217 to prevent water from private water main 206 from entering the municipal water supply in municipal water main 207. With continued reference to FIGS. 2 and 2A, closed system 200 conducts the flow of water out of the water supply system 201 at first hydrant 202, through a recirculating unit 218 and returns the flow of water back into water supply system 201 at second hydrant 204. Recirculating unit 218 includes at least one pump 220 to pump the flow of water through closed conduit system 200.

Closed conduit system 200 may further include a pair of pig launch and recovery apparatuses 100a and 100b. It should be noted that while shown and described as including pig launch and recovery apparatuses 100a and 100b, one or both of pig launch and recovery apparatuses 100a and 100b may be swapped with a respective pig launch and recovery apparatus 100x as shown and described above with regard to FIG. 1A with equal effect. First pig launch and recovery apparatus 100a may be coupled to first hydrant 202 at second flow end 106a while first flow end 104a is coupled to recirculating unit 218 via a hose 222 or other type of conduit. Second pig launch and recovery apparatus 100b may be coupled to second hydrant 204 at second flow end 106b while first flow end 104b is coupled to recirculating unit 218 via a hose 224 or other type of conduit. In this manner, water main 206, trunk pipes 214, 216, recirculating unit 218, hydrants 202, 204, pig launch and recovery apparatuses 100a, 100b and hoses 222, 224 create a closed recirculating fluid circuit 226 whereby all of the flow of water taken from water supply system 201 is returned to the water supply system and no water is wasted or run off into the environment. It should be further noted that pig lunch and recovery apparatuses 100a, 100b, (100x) and recirculating unit 218 are coupled inline and pressurized via the water supply system prior to isolation of water main 206 and trunk pipes 214, 216 (i.e. prior to closing of all valves 212). Pump 220 is then powered so as to generate and controlled flow of the isolated, pressurized water within closed recirculating fluid circuit 226.

In a further aspect of the present invention, recirculating unit 218 may also include one or more in-line filter units 228 to receive the flow of water from water supply system 201 within closed recirculating fluid circuit 226. Filter unit 228 may be a particulate filter or a granular activated charcoal (carbon) filter (GAC filter), and multiple filter units 228 may be serially connected, connected in parallel, or independently turned on and off as desired, within closed recirculating fluid circuit 226, as needed. In this manner, the one or more filter units 228 may filter and/or adsorb the undesirable particulates or other matter from the water so that water main 206 of water supply system 201 is cleaned between the hydrants 202 and 204. All of the flow of water taken from water supply system 201 is returned to water supply system 201 free of all the undesirable matter and no water is wasted or discharged into the environment.

Provision of pig launch and recovery apparatuses 100a and 100b allows for controlled introduction and removal of one or more pigs (e.g., pigs 130a, 130b) depending upon the service needed/requested. As will be described in greater detail below, a pig may be equipped with one or more of a camera, a global positioning system (GPS) sensor, a scrubber, a battery and a light, such as an LED. In this manner, closed conduit system 200 can efficiently perform a number of services, including flow rate testing, flushing, scrubbing, disinfecting, videoing, global information system (GIS) visualization, leak detection using a single system without requiring depressurization of the water main or wasting of hundreds or thousands of gallons of water.

Figure 3:
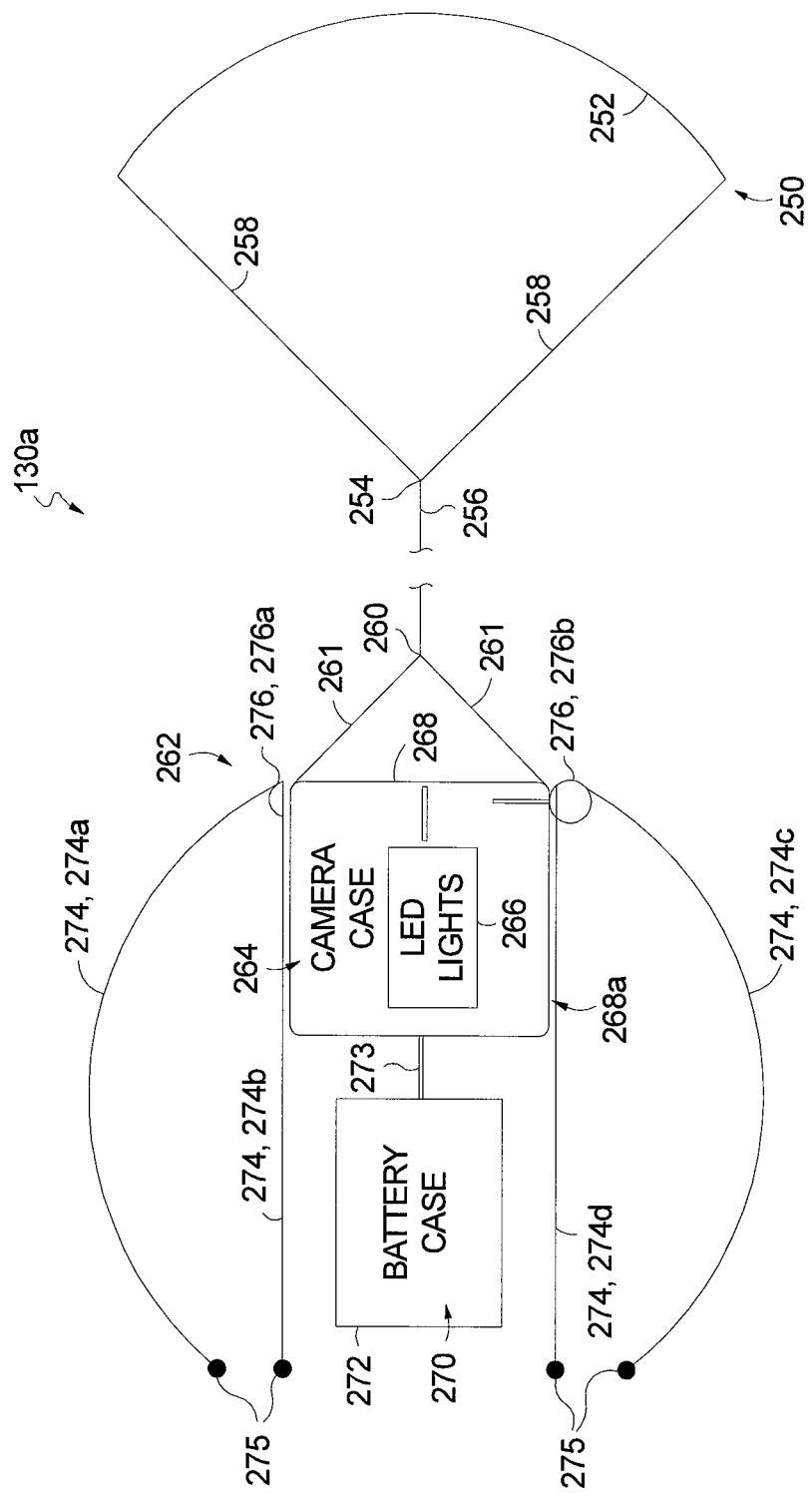
FIG. 3 is a top plan view of an embodiment of a pig for use within a water supply system.
Figure 4:
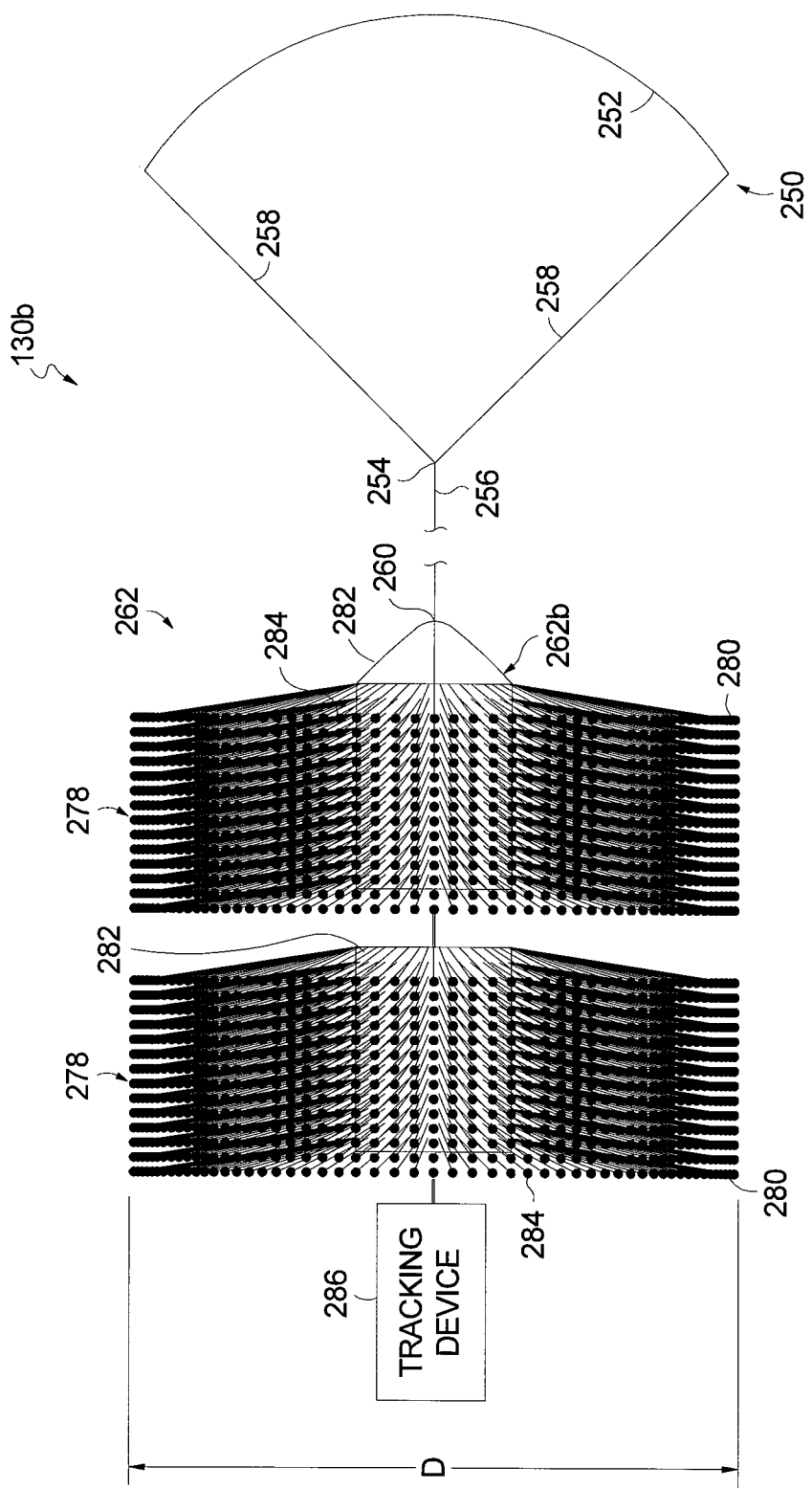
FIG. 4 is a top plan view of an additional embodiment of a pig for use within a water supply system.

With reference to FIGS. 3 and 4, pigs 130a, 130b may generally include a drogue chute 250 having a webbing canopy 252 connected to a first end 254 of riser 256 using two or more suspension lines 258. Second end 260 of riser 256 is coupled to a pig load 262. With reference to pig 130a shown in FIG. 3, the second end 260 of riser 256 may be connected to pig load 262 using two connectors 261 that are attached to opposite front corners thereof.

As shown in FIG. 3, pig 130a may include a pig load 262a having a camera 264 and one or more lights 266 housed within a camera case 268 to enable visual inspection of the interior of water main 206 and trunk pipes 214, 216. In one aspect of the invention, lights 266 are light emitting diodes (LEDs) used to illuminate the pipe walls. A battery 270 is coupled to camera case 268 so as to provide electrical power to camera 264 and lights 266. Battery 270 may be included within camera case 268 or may be housed with a battery case 272. Battery case 272 may be rigidly of flexibly connected to camera case 268. In one aspect of the invention, battery case 272 is moveably or flexibly coupled to camera case 268 to allow pig load 262a to bend or flex when encountering a curve or turning corners as pig 130a passes through closed recirculating fluid circuit 226.

As further seen in FIG. 3, camera case 268 may further include a plurality of stabilizer guides 274 configured to center pig load 262a within water main 206 and trunk pipes 214, 216. Stabilizer guides 274 may be mounted to camera case 268 using respective pivoting mounts 276 located adjacent to opposite front corners thereof. Stabilizer guides 274 may be elongated wire members that extend the length of pig load 262. Distal ends of each stabilizer guide 274 may have a ball 275 coupled thereto. Pivoting mounts 276 allow pig load 262a to rotate within, and stay positioned within, stabilizer guides 274 so that pig load 262a maintains it centered orientation as pig 130a travels around curves or bends or has its flow reversed in the event that pig 130a becomes stuck or lodged within water main 206 or trunk pipe 214, 216. In one example, there may be two stabilizer guides 274a, 274b extending from one pivoting mount 276a, and two stabilizer guides 274c, 274d extending from another pivoting mount 276b. Stabilizer guides 274a, 274b may extend to one side of pig load 262 and below pig load 262, respectively. Stabilizer guides 274c, 274d may extend to the other side of pig load 262 and above pig load 262, respectively. In this respect, stabilizer guides 274a-d surround pig load 262 and operate to position pig load 262 generally in the middle or central location as it travels through the pipe.

Turning now to FIG. 4, an alternative or additional pig 130b includes a pig load 262b comprising one or more scrubbers 278 coupled to second end 260 of riser 256. Scrubbers 278 may include a plurality of spring wire brushes 280 extending radially outwardly from an outer surface of a scrubber body 282. In accordance with an aspect of the present invention, a diameter D of scrubber 278 may be slightly larger than a diameter of the largest pipe comprising the water main 206 and trunk pipes 214, 216. In this manner, brushes 280 may flex within water main 206 and trunk pipes 214, 216 such that wire ends 284 scour the inner surface of the pipes, thereby dislodging materials affixed to the inner walls of water main 206 and trunk pipes 214, 216. FIG. load 262b may also include a tracking device 286 (e.g., a GPS sensor) to locate and track the position of pig 130b within closed recirculating fluid circuit 226.

In use, with reference to FIGS. 2 and 2A, a method for pigging a section of a water supply system comprises the steps of connecting a first pig launch and recovery apparatus is connected to the first hydrant, such as by coupling second flow end 106a of first pig launch and recovery apparatus 100a to first hydrant 202, and connecting a second pig launch and recovery apparatus to second hydrant 204, such as by coupling second flow end 106b of second pig launch and recovery apparatus 100b to second hydrant 204. Recirculating unit 218 is then connected to the first and second pig launch and recovery apparatuses 100a, 100b, such as via respective hoses 222, 224 and first flow ends 104a, 104b. At this point, water may flow though closed recirculating fluid circuit 226 under water supply high pressure. Next, a section of a water supply system is isolated between the first hydrant and the second hydrant, such as by closing valves 212 to create a closed recirculating fluid circuit 226. Thus, an isolated section of water main 206 is defined between trunk pipes 214, 216 and first and second hydrants 202, 204. Pump 220 within recirculating unit 218 may then initiate and control flow of the pressurized water within closed recirculating fluid circuit 226.

To pig the isolated section of water main 206, with reference to FIGS. 2-4, a pig 130a, 130b is loaded into second pig launch and recovery apparatus 100b. To load the pig, first and second valves 122b, 124b are closed and tube access door 126b (tube access cap 126x) is opened so that pig 130a, 130b can placed within first portion 116b' of launch and recovery tube 116b. (Prior to opening tube access door 126b, bleed valve 128b may be opened to relieve any water/air pressure within launch and recovery tube 116b). Once pig 130a, 130b is inserted, tube access door 126b is closed and first and second valves 122b, 124b are opened. Water will then flow into launch and recovery tube 116b and propel pig 130a, 130b out of second portion 116b" of launch and recovery tube 116b, guided by screen 132, and into closed recirculating fluid circuit 226 at second hydrant 204. Pig 130a, 130b will then travel through trunk pipe 216, water main 206 and trunk pipe 214 to first hydrant 202.

To remove pig 130a, 130b from first pig launch and recovery apparatus 100b, first and second valves 122a, 124a are opened and tube access door 126a is closed. Pig 130a, 130b exits first hydrant 202 and, through interaction with angled screen 132, is directed into secondary fluid pathway 136a of second portion 116a" of launch and recovery tube 116a. Once the pig is disposed in first portion 116a', first and second valves 122a, 124a are closed and tube access door 126a is opened so that FIG. 130a, 130b can be extract from first pig launch and recovery apparatus 100a. Prior to opening tube access door 126a, bleed valve 128a may be opened to relieve any water/air pressure within launch and recovery tube 116a.

From the above description, one skilled in the art would recognize that a variety of pigs may serially be added and removed from the system to perform multiple functions during a single operation. By way of example and without limitation thereto, closed conduit system 200 may be flushed without a pig to remove sediment collected in pipes or to test system flow rates to ensure compliance with fire protection flow requirements. Scrubber pig 130b may then be launched and recovered such that trunk pipes 214, 216 and water main 206 are scoured clean of internal build-up. Camera pig 130a, with optional leak detection capabilities, may then be launched and recovered so that the internal surface of the pipes can be inspected and monitored for potential failure and need for replacement. GPS sensors and GIS functionality may assist in locating the exact location of a leak or weakness so that the pipe may be uncovered and repaired without requiring overly extensive digging or disruption of the surface.

Figure 5:
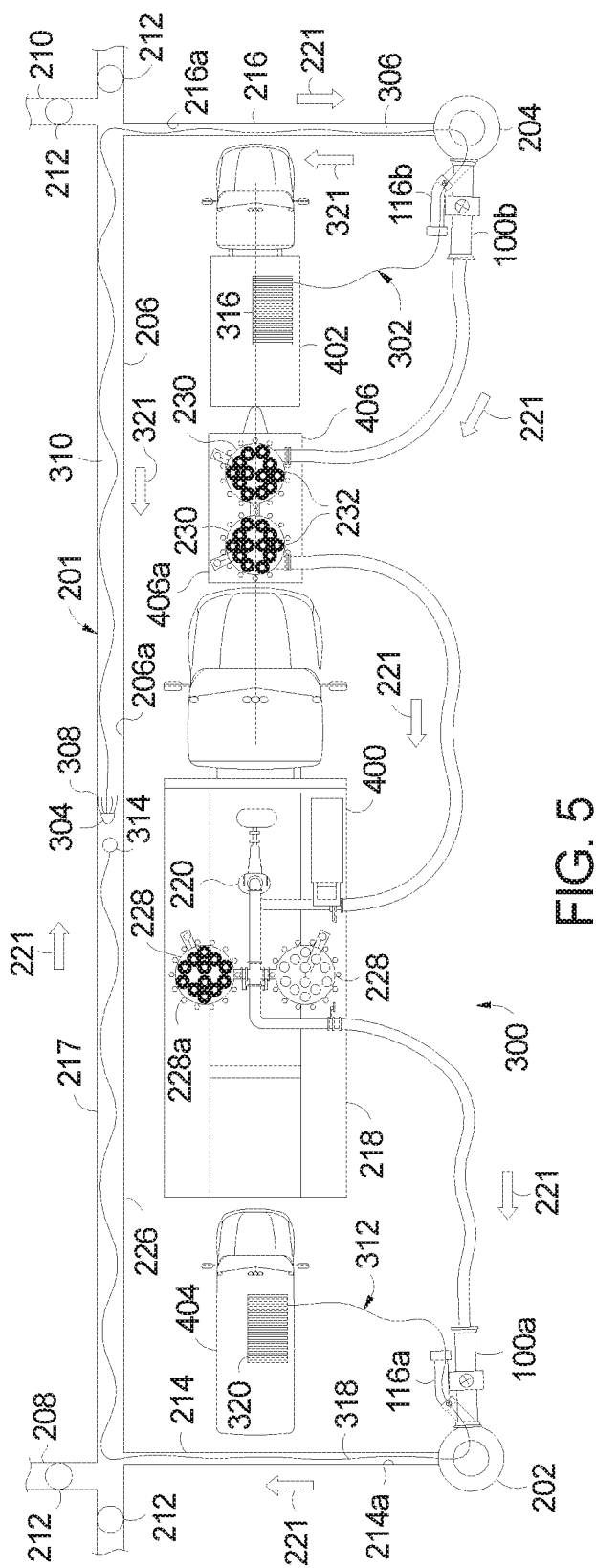
FIG. 5 is a top plan view of a closed system for a flushing a municipal water supply system employing a water jetting system in accordance with another aspect of the invention.
Figure 6:
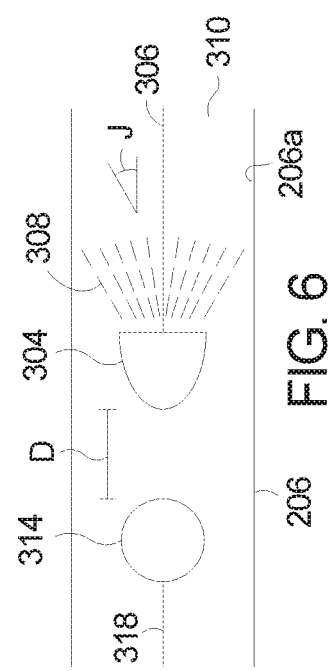
FIG. 6 is an exploded view of the jetting unit and camera used within the water jetting system shown in FIG. 5.

With reference to FIGS. 5 and 6, a high pressure jetting system 300 for use with water supply system 201 having a plurality of sections including water mains 206, 208, 210, pipes 214, 216, hydrants 202, 204 and valves 212 as described above. High pressure jetting system 300 includes a recirculating unit 218 configured to connect to an isolated section 206, 214, 216 (collectively, isolated section 217) of the water supply system 201 between a first point (e.g., hydrant 202) and a second point (e.g., hydrant 204) while the isolated section remains under water supply system pressure. As described above, recirculating unit 218 includes at least one filter unit 228 defining a closed circuit 226 that includes the isolated section 217 and at least one pump unit 220 capable of generating a circulating flow of water generally indicated via arrows 221. A first pig launch and recovery apparatus 100a is configured to couple the first point (hydrant 202) to recirculating unit 218 and a second pig launch and recovery apparatus 100b is configured to couple the second point (hydrant 204) to recirculating unit 218.

As shown in FIG. 5, high pressure jetting system 300 includes a jetting unit 302 having a jetting head 304 coupled to a jetting hose 306. Jetting unit 302 is configured to enter closed circuit 226 through second pig launch and recovery apparatus 100b (such as via launch and recovery tube 116b) and travel within isolated section 217. As further shown in FIG. 6, jetting head 304 is configured to receive a high pressure fluid (water) and emit a plurality of water jets 308 to assist removal of material from an inner surface 206a of water main 206. Material may also be removed from inner surface 214a, 216a of pipes 214, 216, respectively. In accordance with an aspect of the present invention, jetting head 304 may emit water jets 308 at angle J relative to jetting hose 306. By way of example and without limitation thereto, while any angle may be utilized, water jets 308 are typically emitted having angles J between about 30 degrees and 60 about degrees.

In accordance with another aspect of the present invention, the flow rate of water jets 308 exceeds the flow rate of circulating flow of water 221. As a result, jetting unit 302 is configured to move in a counter-current flow direction 321 from second point (hydrant 204) to first point (hydrant 202). In this manner, jetting unit 302 may progress along isolated section 217 while circulating flow of water 221 operates to flush removed material 310 in the normal flushing flow direction to the at least one filter unit 228 on board recirculation unit 218. Removed material 310 may then be filtered out of circulating flow of water 221 before the water returns to first pig launch and recovery apparatus 100a (and isolated section 217) for re-entry into water main 206.

In accordance with a further aspect of the present invention, high pressure jetting system 300 may include one or more additional rough filter (e.g., pre-filter) units 230 placed inline closed circuit 226 between second pig launch and recovery apparatus 100b and filter unit 228. Rough filter units 230 may generally comprise filter subunits 232 having a coarse basket screen. Each coarse basket screen may, for example and without limitation thereto, include a mesh having pore sizes on the order of 0.0625 inches (1.6 mm). Thus, as jetting unit 302 dislodges material 310, any particles larger than the pore size (e.g., 0.0625 inches), will be retained within rough filter unit 230 before circulating flow of water 221 passes into filter unit 228. Filter unit 228 may then include filter bag subunits 228a having mesh sizes on the order of 1-200 micron. Thus, circulating flow of water 221 sequentially passes through rough filter units 230, and then filter units 228, before reentering water main 206 as generally sediment-free water. In still another aspect, rough filter units 230 may be cleaned and reused "on the fly." In other words, an individual filter subunit 232 may be removed from its rough filter unit 230, cleaned, and returned to rough filter unit 230, all while pump 220 maintains circulating flow of water 221.

In accordance with a further aspect of the present invention, high pressure jetting system 300 may also include a camera unit 312 including a camera 314. Camera 314 may be configured to enter closed circuit 226 through first pig launch and recovery apparatus 100a (such as via launch and recovery tube 116a) such that camera 314 initially travels in the normal flushing flow direction of circulating flow of water 221 until camera 314 is proximate to jetting unit 302. Camera 314 may then move in conjunction with jetting unit 302 in the counter-current flow direction 321 Camera 314 may then provide a visual output of the removal of material 310 from inner surface 206a.

To facilitate controlled travel of jetting unit 302, jetting hose 306 may be wound around a spool 316 whereby travel along counter-current flow direction 321 may be regulated via selectively unspooling of jetting hose 306. By way of example, jetting hose 306 may be controllably advanced along isolated section 217 only after the image captured by camera 314 indicates that a desired/sufficient amount of material 310 has been removed from inner surface 206a. Once the entirety (or desired amount) of isolated section 217 has been cleaned with jetting unit 302, the supply of high pressure fluid to jetting hose 306 may be terminated and spool 316 may be rewound. As a result, jetting hose and jetting head 304 may be extracted from isolated section 217 via launch and recovery tube 116b.

Similarly, camera 314 may be mounted onto a camera cord 318 which is, in turn, wound around a camera spool 320. Passive travel of camera 314 along circulating flow of water 221 may be regulated via selectively unspooling of camera cord 318. By way of example, camera cord 318 may be controllably unspooled from spool 320 until camera 314 is proximate jetting head 304. As jetting head 304 is advanced as described above, camera cord 318 may be rewound so as to maintain a distance D between camera 314 and jetting head 304 (see FIG. 6) while also permitting camera 314 to record images of water jets 308 and inner surface 206a. Once the entirety (or desired amount) of isolated section 217 has been cleaned with jetting unit 302, camera 314 may be extracted from isolated section 217 via launch and recovery tube 116a by fully rewinding camera spool 320.

In accordance with an aspect of the present invention, high pressure jetting system 300 including recirculating unit 218 and jetting unit 302 may be mounted on a single vehicle, such as vehicle 400. Alternatively, recirculating unit 218 may be mounted on vehicle 400 while jetting unit 302 is mounted on a second vehicle 402. Still further, recirculating unit 218 may be mounted on vehicle 400, jetting unit 302 may be mounted on second vehicle 402 and camera unit 312 may be mounted on a third vehicle 404. Rough filter units 230 may be mounted onto vehicle 400, second vehicle 402, or may be mounted onto a fourth vehicle 406, and may include a stand-alone vehicle or trailer 406*a* configured to be towed by vehicle 400 or second vehicle 402.

Figure 7:
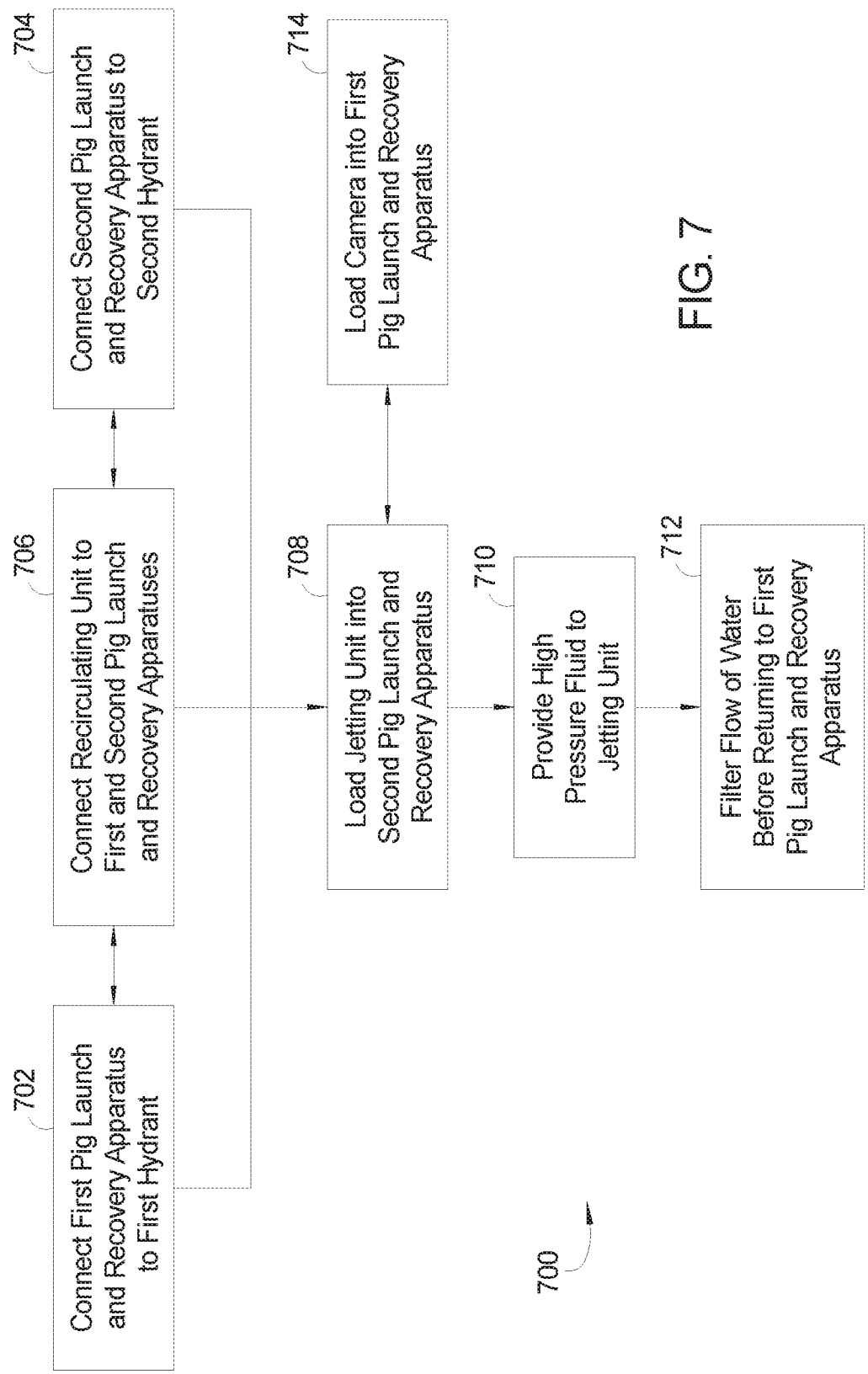
FIG. 7 is a flow diagram of a method for cleaning and flushing an isolated section of a water supply system using high pressure jetting in accordance with an aspect of the present invention.

Turning now to FIG. 7, a method 700 for cleaning and flushing an isolated section of a water supply system having a plurality of sections including water mains, pipes, hydrants and valves may comprise: 702) connecting a first pig launch and recovery apparatus to a first hydrant; 704) connecting a second pig launch and recovery apparatus to a second hydrant; 706) connecting a recirculating unit to the first and second pig launch and recovery apparatuses to create a closed circuit including the isolated section and the recirculating unit, wherein the recirculating unit includes at least one filter unit and at least one pump unit capable of generating a circulating flow of water from the first pig launch and recovery apparatus to the second pig launch and recovery apparatus; 708) loading a jetting unit into the second pig launch and recovery apparatus; and 710) providing a high pressure fluid to the jetting unit to drive the jetting unit from the second pig launch and recovery apparatus toward the first pig launch and recovery apparatus, wherein the high pressure fluid is emitted as a plurality of water jets from a jetting head to assist removal of material from an inner surface of the water mains and pipes defining at least a portion of the isolated section.

As described above with regard to high pressure jetting system 300, the jetting unit is driven in a counter-current flow direction from the second point to the first point which is opposite to a normal flushing flow direction of the circulating flow of water from the first point to the second point. Removed material then moves in the normal flushing flow direction to the at least one filter unit. Thus, method 700 may further include step 712, filtering the removed material from the circulating flow of water before the water returns to the first pig launch and recovery apparatus.

In accordance with another aspect of the present invention, method 700 may still further include step 714, loading a camera unit including a camera into the first pig launch and recovery apparatus, wherein the camera is initially configured to travel in the normal flushing flow direction until the camera is proximate the jetting unit, whereby the camera then moves in conjunction with the jetting unit in the counter-current flow direction so as to provide a visual output of the removal of material from the inner surface of the water mains and pipes.

Figure 8:
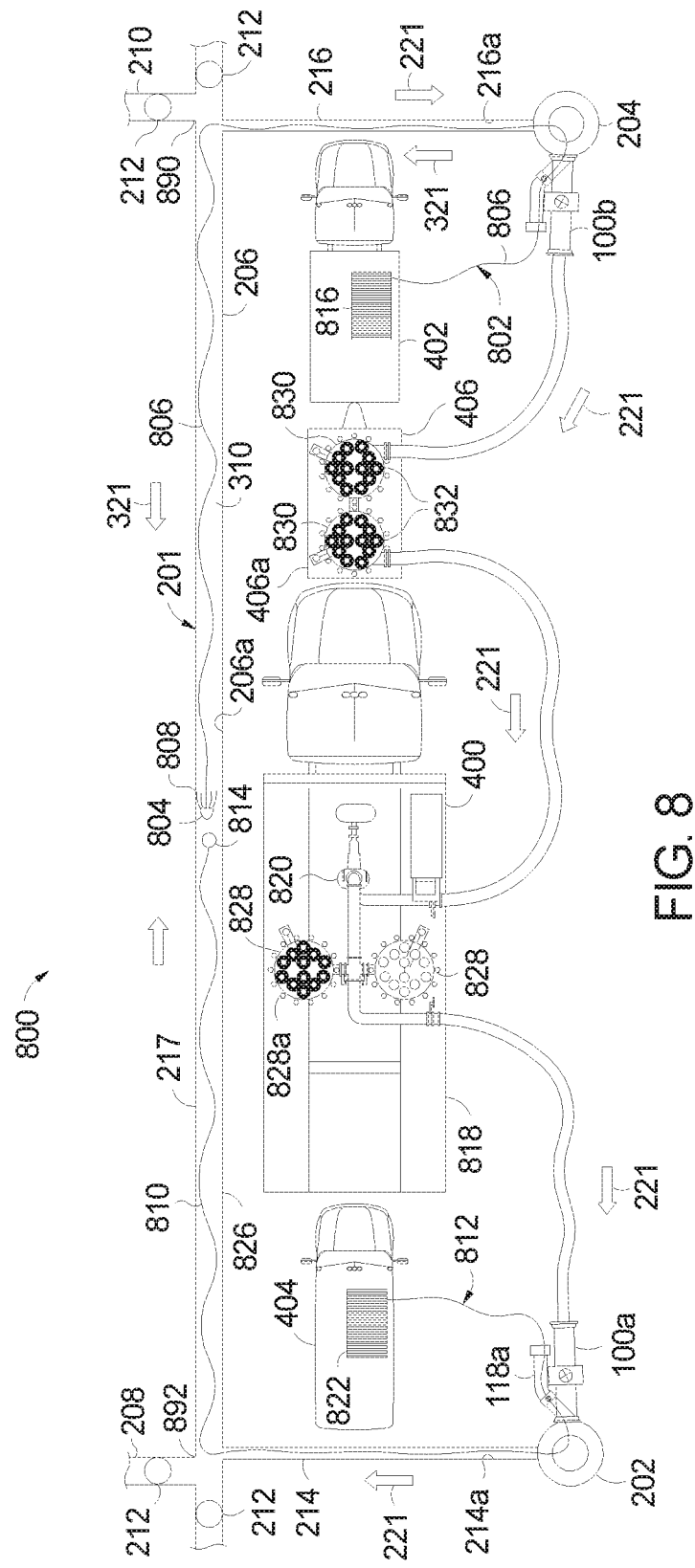
FIG. 8 is a top plan view of a closed system for a flushing a municipal water supply system employing a water jetting system with directional control in accordance with yet another aspect of the invention.
Figure 9A:
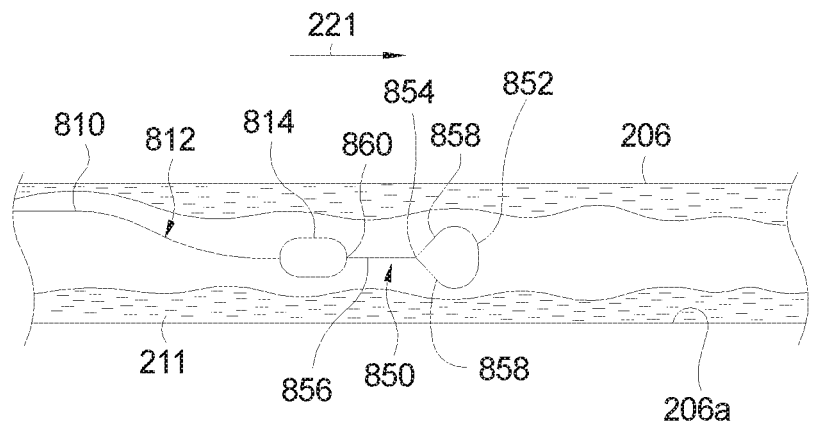
FIG. 9A is an expanded view of a camera with drogue chute used within the water jetting system shown in FIG. 8.
Figure 9B:
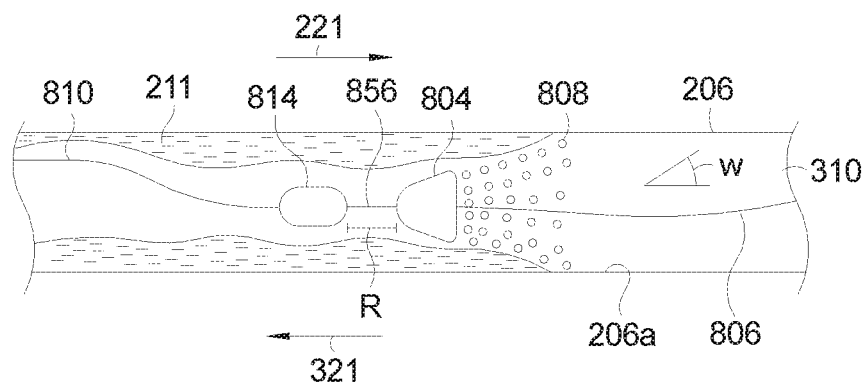
FIG. 9B is an expanded view of the camera shown in FIG. 9A with the drogue chute replaced with the water jetting system.
Figure 10:
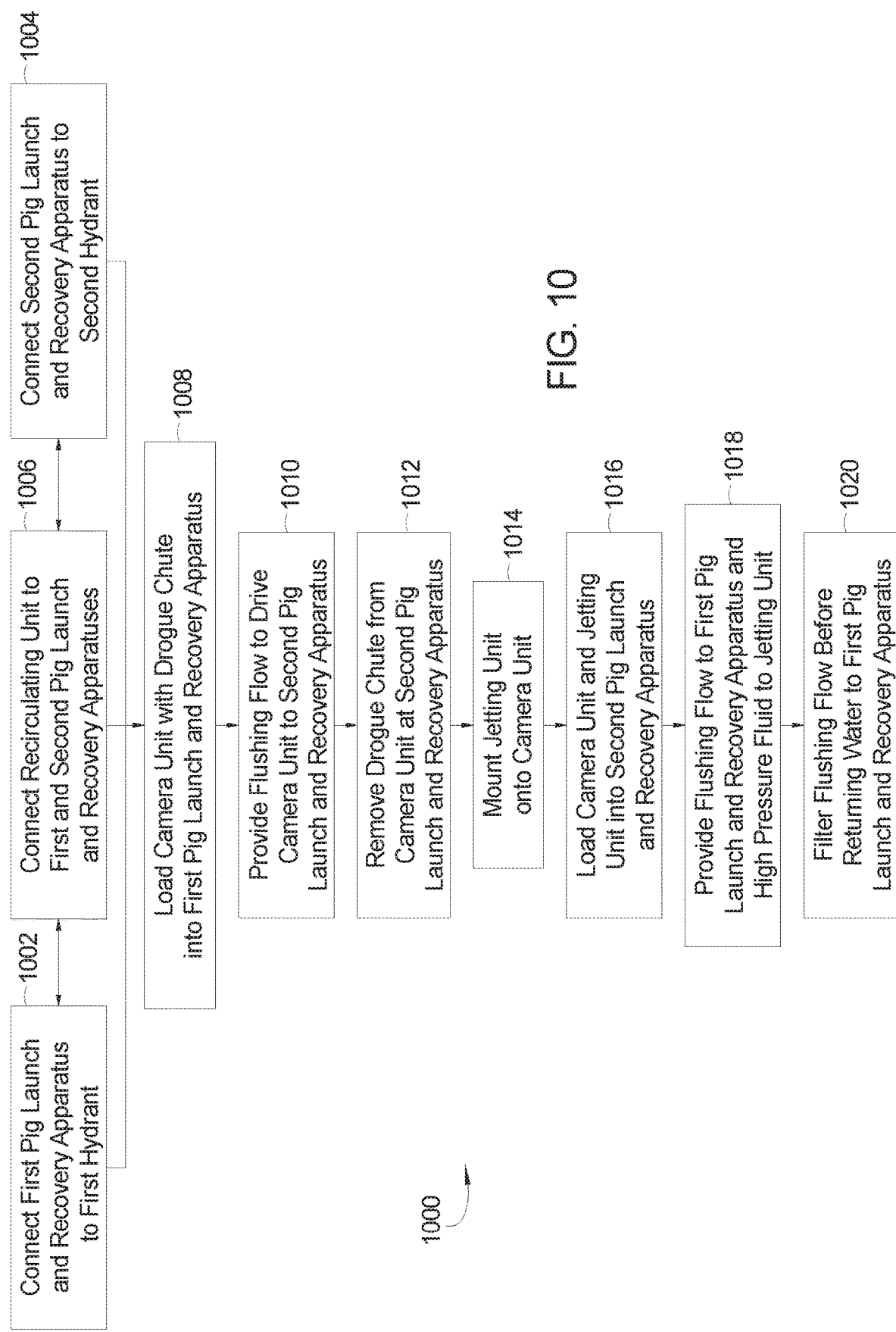
FIG. 10 is a flow diagram of a method for cleaning and flushing an isolated section of a water supply system using high pressure jetting with directional control in accordance with an aspect of the present invention.

Turning now to FIGS. 8-10, an alternative high pressure jetting system 800 is shown. High pressure jetting system 800 is substantially identical to high pressure jetting system 300 described above with reference to FIGS. 5-7. High pressure jetting system 800 is configured for use with water supply system 201 having a plurality of sections including water mains 206, 208, 210, pipes 214, 216, hydrants 202, 204 and valves 212 as described above. Similar to high pressure jetting system 300, high pressure jetting system 800 includes a recirculating unit 818 configured to connect to an isolated section 206, 214, 216 (collectively, isolated section 217) of the water supply system 201 between a first point (e.g., hydrant 202) and a second point (e.g., hydrant 204) while the isolated section remains under water supply system pressure.

As described above, recirculating unit 818 includes at least one filter unit 828 defining a closed circuit 826 that includes the isolated section 217 and at least one pump unit 820 capable of generating a circulating flow of water generally indicated via arrows 221. A first pig launch and recovery apparatus 100*a* is configured to couple the first point (hydrant 202) to recirculating unit 818 and a second pig launch and recovery apparatus 100*b* is configured to couple the second point (hydrant 204) to recirculating unit 818.

High pressure jetting system 800 may also include a camera unit 812 including a camera 814 similar to camera unit 312 including a camera 314, as described above. Camera 814 may be configured to enter closed circuit 826 through first pig launch and recovery apparatus 100*a* (such as via launch and recovery tube 116*a*) such that camera 814 initially travels in the normal flushing flow direction of circulating flow of water 221. With reference to FIG. 9A, to promote travel of camera 814 in flushing flow direction of circulating flow of water 221, camera 814 may include a drogue chute 850 having a webbing canopy 852 similar to drogue chute 250 and webbing canopy 252 described above. Webbing canopy 852 may be connected to a first end 854 of riser 856 using two or more suspension lines 858. Second end 860 of riser 856 is coupled to camera 814. Webbing canopy 852 may open through action of circulating flow of water 221 such that drogue chute 850 may assist travel of camera 814 from first pig launch and recovery apparatus 100*a* to second pig launch and recovery apparatus 100*b* by dragging camera 814 along and within circulating flow of water 221. As a result, camera 814 and drogue chute 850 may travel within isolated section 217 without requiring additional directional aid.

As shown in FIG. 8, high pressure jetting system 800 includes a jetting unit 802 having a jetting head 804 coupled to a jetting hose 806 similar to jetting unit 302. Jetting unit 802 is configured to enter closed circuit 226 through second pig launch and recovery apparatus 100*b* (such as via launch and recovery tube 116*b*) and travel within isolated section 217. As further shown in FIG. 9B, jetting head 804 is configured to receive a high pressure fluid (water) and emit a plurality of water jets 808 to assist removal of material 211 from an inner surface 206*a* of water main 206 as removed material 310. Material 211 may also be removed from inner surface 214*a*, 216*a* of pipes 214, 216, respectively. In accordance with an aspect of the present invention, jetting head 804 may emit water jets 808 at angle W relative to jetting hose 806. By way of example and without limitation thereto, while any angle may be utilized, water jets 808 are typically emitted having angles W between about 30 degrees and 60 about degrees.

In accordance with an aspect of the present invention, the flow rate of water jets 808 exceeds the flow rate of circulating flow of water 221. As a result, jetting unit 802 is configured to move in a counter-current flow direction 321 from second point (hydrant 204) to first point (hydrant 202). Directional travel of jetting unit 802 may be assisted by camera 814 and riser 856 via rewinding of camera cord 810, as will be discussed in greater detail below. The length R of riser 856 may be selected such that camera 814 may provide a visual output of the removal of material 211 from inner surface 206*a* without removed material 310 interfering with the camera view. In this manner, jetting unit 802 may progress along isolated section 217 while circulating flow of water 221 operates to flush removed material 310 in the normal flushing flow direction to the at least one filter unit 828 on board recirculation unit 818. Removed material 310 may then be filtered out of circulating flow of water 221 before the water returns to first pig launch and recovery apparatus 100*a* (and isolated section 217) for re-entry into water main 206.

In accordance with a further aspect of the present invention, high pressure jetting system 800 may include one or more additional rough filter (e.g., pre-filter) units 830 placed inline closed circuit 226 between second pig launch and recovery apparatus 100b and filter unit 828. Rough filter units 830 may generally comprise filter subunits 832 having a coarse basket screen. Each coarse basket screen may, for example and without limitation thereto, include a mesh having pore sizes on the order of 0.0625 inches (1.6 mm). Thus, as jetting unit 802 dislodges material 310, any particles larger than the pore size (e.g., 0.0625 inches), will be retained within rough filter unit 830 before circulating flow of water 221 passes into filter unit 828. Filter unit 828 may then include filter bag subunits 828a having mesh sizes on the order of 1-200 micron. Thus, circulating flow of water 221 sequentially passes through rough filter units 830, and then filter units 828, before reentering water main 206 as generally sediment-free water. In still another aspect, rough filter units 830 may be cleaned and reused "on the fly." In other words, an individual filter subunit 832 may be removed from its rough filter unit 830, cleaned, and returned to rough filter unit 830, all while pump 820 maintains circulating flow of water 221.

To facilitate controlled travel of jetting unit 802, jetting hose 806 may be wound around a spool 816 whereby travel along counter-current flow direction 321 may be regulated via selectively unspooling of jetting hose 806. By way of example, jetting hose 806 may be controllably advanced along isolated section 217 only after the image captured by camera 814 indicates that a desired/sufficient amount of material 211 has been removed from inner surface 206a. When jetting unit 802 arrives at a junction, such as junctions 890, 892, directional travel of jetting unit 802 is manipulated by camera cord 810, camera 814 and riser 856 which is being re-spooled on spool 822. Once the entirety (or desired amount) of isolated section 217 has been cleaned with jetting unit 802, the supply of high pressure fluid to jetting hose 806 may be terminated and jetting unit 802 may be decoupled from riser 856. Spool 816 may then be rewound to retract jetting unit 802 through second pig launch and recovery apparatus 100b.

In accordance with an aspect of the present invention, high pressure jetting system 800 including recirculating unit 818 and jetting unit 802 may be mounted on a single vehicle, such as vehicle 400. Alternatively, recirculating unit 818 may be mounted on vehicle 400 while jetting unit 802 is mounted on a second vehicle 402. Still further, recirculating unit 818 may be mounted on vehicle 400, jetting unit 802 may be mounted on second vehicle 402 and camera unit 812 may be mounted on a third vehicle 404. Rough filter units 830 may be mounted onto vehicle 400, second vehicle 402, or may be mounted onto a fourth vehicle 406, and may include a stand-alone vehicle or trailer 406a configured to be towed by vehicle 400 or second vehicle 402.

Turning now to FIG. 10, an exemplary method 1000 for cleaning and flushing an isolated section of a water supply system having a plurality of sections including water mains, pipes, hydrants and valves may comprise: 1002) connecting a first pig launch and recovery apparatus to a first hydrant; 1004) connecting a second pig launch and recovery apparatus to a second hydrant; and 1006) connecting a recirculating unit to the first and second pig launch and recovery apparatuses to create a closed circuit including the isolated section and the recirculating unit, wherein the recirculating unit includes at least one filter unit and at least one pump unit capable of generating a circulating flow of water from the first pig launch and recovery apparatus to the second pig launch and recovery apparatus.

With the closed circuit established, method 1000 may further include: 1008) loading a camera unit including a camera and drogue chute into the first pig launch and recovery apparatus; 1010) providing a flushing flow to drive the camera unit to the second pig launch and recovery apparatus with the assistance of the drogue chute; and 1012) removing the drogue chute from the camera unit at the second pig launch and recovery apparatus.

With the camera with removed drogue chute located at the second pig launch and recovery apparatus after passing through the closed circuit, method 100 may further include: 1014) mounting a jetting unit to the camera unit; 1016) loading the camera unit and jetting unit into the second pig launch and recovery apparatus; and 1018) providing a flushing flow to the first pig launch and recovery apparatus while also providing a high pressure fluid to the jetting unit to drive the jetting unit from the second pig launch and recovery apparatus toward the first pig launch and recovery apparatus with the assistance of the camera unit, wherein the high pressure fluid is emitted as a plurality of water jets from a jetting head to facilitate removal of material from an inner surface of the water mains and pipes defining at least a portion of the isolated section.

As described above with regard to high pressure jetting system 800, the jetting unit is driven in a counter-current flow direction from the second point to the first point which is opposite to a normal flushing flow direction of the circulating flow of water from the first point to the second point. Removed material then moves in the normal flushing flow direction to the at least one filter unit. Thus, method 1000 may further include: 1020) filtering the removed material from the circulating flow of water before the water returns to the first pig launch and recovery apparatus.

From the foregoing, it will be seen that this invention is one well adapted to attain all the ends and objects hereinabove set forth together with other advantages which are obvious and which are inherent to the system and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method for cleaning and flushing a section of a water supply system, the section including at least one water main, a first hydrant, a second hydrant, and at least one valve, the method comprising:

a) connecting a first pig launch and recovery apparatus to the first hydrant;

b) connecting a second pig launch and recovery apparatus to the second hydrant;
c) connecting a recirculating unit to the first pig launch and recovery apparatus and the second pig launch and recovery apparatus to connect to the section of the water supply system between a first point and a second point thereby defining a circuit, wherein the recirculating unit includes at least one filter unit and at least one pump unit generating a circulating flow of water in a first flow direction from the first pig launch and recovery apparatus to the second pig launch and recovery apparatus, and wherein the section remains under continuous water supply system pressure throughout the cleaning and flushing;
d) loading a drogue chute coupled to a cord into the first pig launch and recovery apparatus while the section remains under water supply system pressure;
e) providing the circulating flow at the first pig launch and recovery apparatus to drive the drogue chute and the cord in the first flow direction to the second pig launch and recovery apparatus;
f) removing the drogue chute from the cord at the second pig launch and recovery apparatus while the section remains under water supply system pressure;
g) mounting a jetting unit to the cord, wherein the jetting unit includes a jetting head;
h) loading the jetting unit into the second pig launch and recovery apparatus while the section remains under water supply system pressure;
i) providing a high pressure fluid to the jetting unit to drive the jetting unit in a second flow direction from the second pig launch and recovery apparatus toward the first pig launch and recovery apparatus, wherein the second flow direction is opposite of the first flow direction,
wherein the high pressure fluid is emitted as a plurality of water jets from the jetting head to assist removal of material from an inner surface of at least a portion of the section, and
wherein the removed material is carried to the second pig launch and recovery apparatus via the circulating flow of water.

2. The method of claim 1 wherein the cord is further coupled to a camera unit and a riser, wherein the riser removably couples the camera unit to the drogue chute when travelling in the flushing first flow direction and the cord removably couples to the jetting head when travelling in the second flow direction.

3. The method of claim 1 wherein removed material moves in the normal flushing first flow direction to the at least one filter unit, and wherein the method further includes the step of:
a) filtering the removed material from the circulating flow of water before the water recirculates to the first pig launch and recovery apparatus.

4. The method of claim 1 wherein the jetting head is coupled to a jetting hose, and wherein the plurality of water jets are emitted at an angle relative to the jetting hose.

5. The method of claim 4 wherein the angle is between 30 degrees and 60 degrees.

6. The method of claim 1 wherein the recirculating unit is mounted on a first vehicle and the jetting unit is mounted on a second vehicle.

7. The method of claim 2 wherein the recirculating unit, the jetting unit and the camera unit are mounted on one or more vehicles.

8. The method of claim 7 wherein the recirculating unit is mounted on a first vehicle, the jetting unit is mounted on a second vehicle and the camera unit is mounted on a third vehicle.

9. The method of claim 1 wherein the first point is the first hydrant and the second point is the second hydrant, and wherein each pig launch and recovery apparatus comprises:
a flow tube having a first flow end, a second flow end, and a main flow valve located between the first flow end and the second flow end, wherein the first flow end is configured to be fluidly connected with the recirculating unit, and wherein the second flow end is configured to be fluidly connected with its respective hydrant; and
a launch and recovery tube having a first launch end and a second launch end, wherein the second launch end is disposed at an acute angle relative to a longitudinal axis of the flow tube,
wherein the jetting unit enters the circuit through the second launch end of the second pig launch and recovery apparatus.

10. The method of claim 2 wherein the first point is the first hydrant and the second point is the second hydrant, and wherein each pig launch and recovery apparatus comprises:
a flow tube having a first flow end, a second flow end, and a main flow valve located between the first flow end and the second flow end, wherein the first flow end is configured to be fluidly connected with the recirculating unit, and wherein the second flow end is configured to be fluidly connected with its respective hydrant; and
a launch and recovery tube having a first launch end and a second launch end,
wherein the camera unit enters the circuit through the second launch end of the first pig launch and recovery apparatus, and wherein the jetting unit enters the circuit through the second launch end of the second pig launch and recovery apparatus.

11. The method of claim 1 further comprising the step of placing one or more rough filter units inline with the circuit between the second pig launch and recovery apparatus and the at least one filter unit.

12. The method of claim 11 wherein the recirculating unit is mounted on a first vehicle and the jetting unit is mounted on a second vehicle, and wherein the one or more rough filter units are mounted on the first vehicle, the second vehicle, or on a third vehicle.

13. The method of claim 12 wherein the third vehicle is a trailer towed by either the first vehicle or the second vehicle.

14. The method of claim 9 wherein the first launch end is fluidly connected to the flow tube between the first flow end and the main flow valve, and wherein the second launch end is fluidly connected to the flow tube between the main flow valve and the second flow end.

15. The method of claim 9 wherein the acute angle is between about 40 degrees and about 50 degrees.

16. The method of claim 1 wherein the first point is the first hydrant and the second point is the second hydrant.

17. The method of claim 1 wherein the section is one of a plurality of sections of the water supply system, wherein each of the plurality of sections includes a plurality of water mains, pipes, hydrants and valves.

18. A method for cleaning and flushing a section of a water supply system, the section including at least one water main, the method comprising:
a) connecting a first pig launch and recovery apparatus to a first point in the water supply system;

b) connecting a second pig launch and recovery apparatus to a second point in the water supply system;
c) connecting a recirculating unit to the first pig launch and recovery apparatus and the second pig launch and recovery apparatus to connect to the section of the water supply system between the first point and the second point thereby defining a circuit, wherein the recirculating unit includes at least one filter unit and at least one pump unit generating a circulating flow of water in a first flow direction from the first pig launch and recovery apparatus to the second pig launch and recovery apparatus, and wherein the section remains under continuous water supply system pressure throughout the cleaning and flushing;
d) loading a drogue chute coupled to a cord into the first pig launch and recovery apparatus while the section remains under water supply system pressure;
e) providing the circulating flow at the first pig launch and recovery apparatus to drive the drogue chute and the cord in the first flow direction to the second pig launch and recovery apparatus;
f) removing the drogue chute from the cord at the second pig launch and recovery apparatus while the section remains under water supply system pressure;
g) mounting a jetting unit to the cord, wherein the jetting unit includes a jetting head;
h) loading the jetting unit into the second pig launch and recovery apparatus while the section remains under water supply system pressure;
i) providing a high pressure fluid to the jetting unit to drive the jetting unit in a second flow direction from the second pig launch and recovery apparatus toward the first pig launch and recovery apparatus, wherein the second flow direction is opposite of the first flow direction,
wherein the high pressure fluid is emitted as a plurality of water jets from the jetting head to assist removal of material from an inner surface of at least a portion of the section, and
wherein the removed material is carried to the second pig launch and recovery apparatus via the circulating flow of water.

19. The method of claim 18 wherein the cord is further coupled to a camera unit and a riser, wherein the riser removably couples the camera unit to the drogue chute when travelling in the first flow direction and the cord removably couples to the jetting head when travelling in the second flow direction.

20. The method of claim 18 wherein the removed material moves in the first flow direction to the at least one filter unit, and wherein the method further includes the step of:
a) filtering the removed material from the circulating flow of water before the water recirculates to the first pig launch and recovery apparatus.

21. The method of claim 18 wherein the jetting head is coupled to a jetting hose, and wherein the plurality of water jets are emitted at an angle relative to the jetting hose.

22. The method of claim 21 wherein the angle is between 30 degrees and 60 degrees.

23. The method of claim 18 wherein the recirculating unit is mounted on a first vehicle and the jetting unit is mounted on a second vehicle.

24. The method of claim 19 wherein the recirculating unit, the jetting unit and the camera unit are mounted on one or more vehicles.

25. The method of claim 24 wherein the recirculating unit is mounted on a first vehicle, the jetting unit is mounted on a second vehicle and the camera unit is mounted on a third vehicle.

26. The method of claim 18 wherein the section includes a first hydrant and a second hydrant, wherein the first point is the first hydrant and the second point is the second hydrant, and wherein each pig launch and recovery apparatus comprises:
a flow tube having a first flow end, a second flow end, and a main flow valve located between the first flow end and the second flow end, wherein the first flow end is configured to be fluidly connected with the recirculating unit, and wherein the second flow end is configured to be fluidly connected with its respective hydrant; and
a launch and recovery tube having a first launch end and a second launch end, wherein the second launch end is disposed at an acute angle relative to a longitudinal axis of the flow tube,
wherein the jetting unit enters the circuit through the second launch end of the second pig launch and recovery apparatus.

27. The method of claim 19 wherein the section includes a first hydrant and a second hydrant, wherein the first point is the first hydrant and the second point is the second hydrant, and wherein each pig launch and recovery apparatus comprises:
a flow tube having a first flow end, a second flow end, and a main flow valve located between the first flow end and the second flow end, wherein the first flow end is configured to be fluidly connected with the recirculating unit, and wherein the second flow end is configured to be fluidly connected with its respective hydrant; and
a launch and recovery tube having a first launch end and a second launch end,
wherein the camera unit enters the circuit through the second launch end of the first pig launch and recovery apparatus, and wherein the jetting unit enters the circuit through the second launch end of the second pig launch and recovery apparatus.

28. The method of claim 18 further comprising the step of placing one or more rough filter units inline with the circuit between the second pig launch and recovery apparatus and the at least one filter unit.

29. The method of claim 28 wherein the recirculating unit is mounted on a first vehicle and the jetting unit is mounted on a second vehicle, and wherein the one or more rough filter units are mounted on the first vehicle, the second vehicle, or on a third vehicle.

30. The method of claim 29 wherein the third vehicle is a trailer towed by either the first vehicle or the second vehicle.

31. The method of claim 26 wherein the first launch end is fluidly connected to the flow tube between the first flow end and the main flow valve, and wherein the second launch end is fluidly connected to the flow tube between the main flow valve and the second flow end.

32. The method of claim 26 wherein the acute angle is between about 40 degrees and about 50 degrees.

33. The method of claim 18 wherein the section includes a first hydrant and a second hydrant, and wherein the first point is the first hydrant and the second point is the second hydrant.

34. The method of claim 18 wherein the section is one of a plurality of sections of the water supply system, wherein each of the plurality of sections includes a plurality of water mains, pipes, hydrants and valves.

\* \* \* \* \*